United States Patent [19]

Gill et al.

[11] 4,415,767
[45] Nov. 15, 1983

[54] METHOD AND APPARATUS FOR SPEECH RECOGNITION AND REPRODUCTION

[75] Inventors: Stephen P. Gill, Atherton; Lawrence F. Wagner, Berkeley; Gregory G. Frye, San Leandro; Klaus-Peter A. Bantowsky, Hayward, all of Calif.

[73] Assignee: Votan, Fremont, Calif.

[21] Appl. No.: 312,801

[22] Filed: Oct. 19, 1981

[51] Int. Cl.³ .............................................. G10L 1/00
[52] U.S. Cl. ....................................... 381/45; 381/51; 364/513.5
[58] Field of Search .............. 179/1 SA, 1 SD, 1 SM, 179/15.55 R; 364/513, 726

[56] References Cited

U.S. PATENT DOCUMENTS

| | | | |
|---|---|---|---|
| 3,816,722 | 6/1974 | Sakoe et al. | 179/1 SD |
| 3,952,164 | 4/1976 | David et al. | 179/15.55 R |
| 3,982,070 | 9/1976 | Flanagan | 179/1 SM |
| 4,181,821 | 6/1980 | Pirz et al. | 179/1 SD |

*Primary Examiner*—Emanuel S. Kemeny
*Attorney, Agent, or Firm*—Owen, Wickersham & Erickson

[57] ABSTRACT

Speech signal analysis for data reduction, as stored for synthesis or recognition, is improved by features including: digital spectral analysis; reduction of channel data and bit allocation by selective summation of groups of contiguous data; using the mean average of the log amplitude to find the deviation for each channel; also using the instaneous shape of the mean value for each channel for pairs of adjacent frames, all combined to find a feature ensemble for each pair of adjacent frames.

28 Claims, 16 Drawing Figures

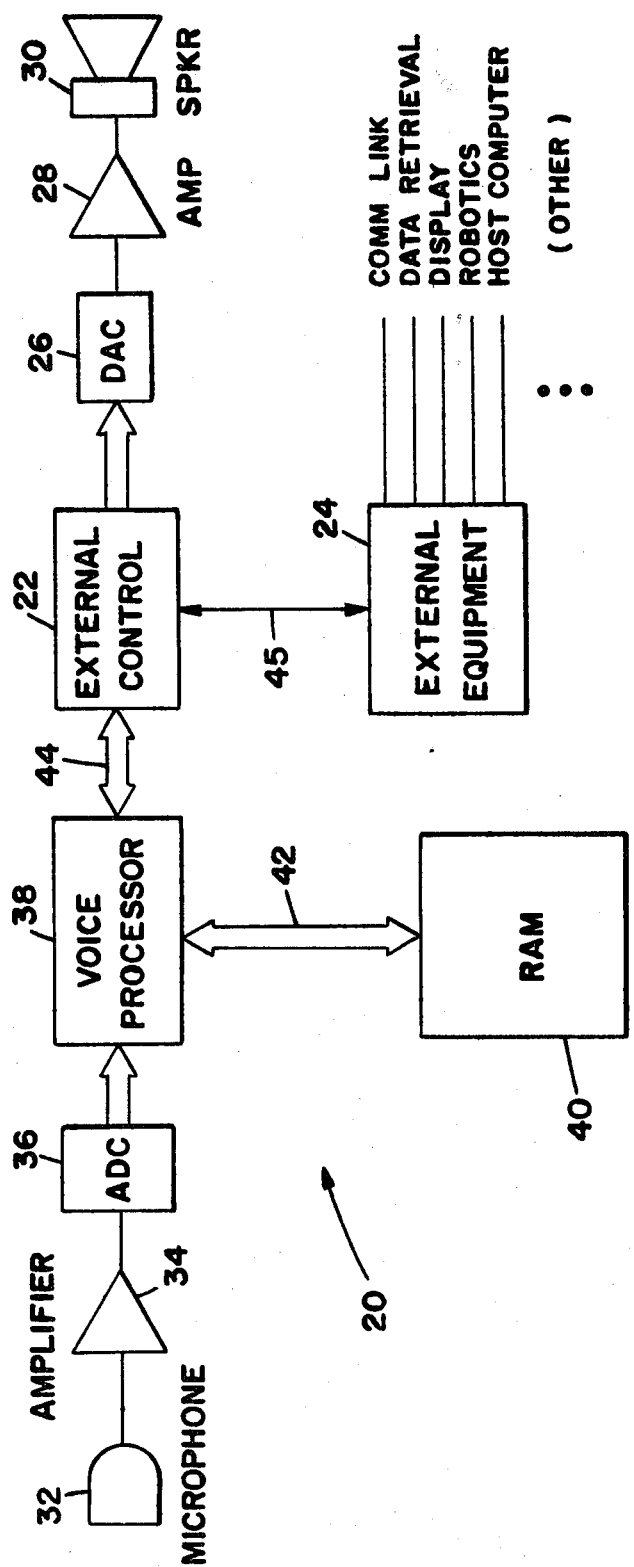
FIG_1

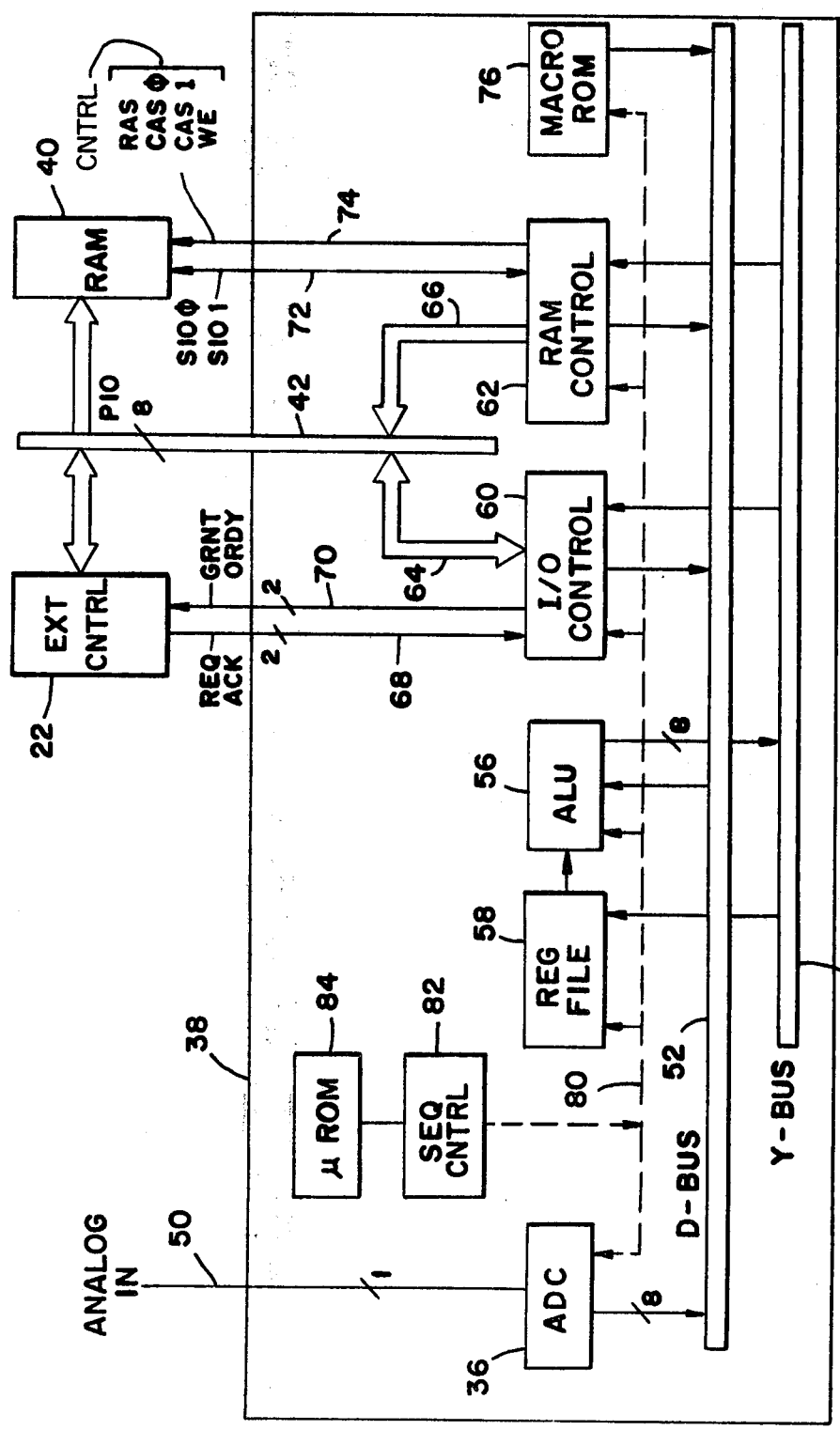
FIG_2

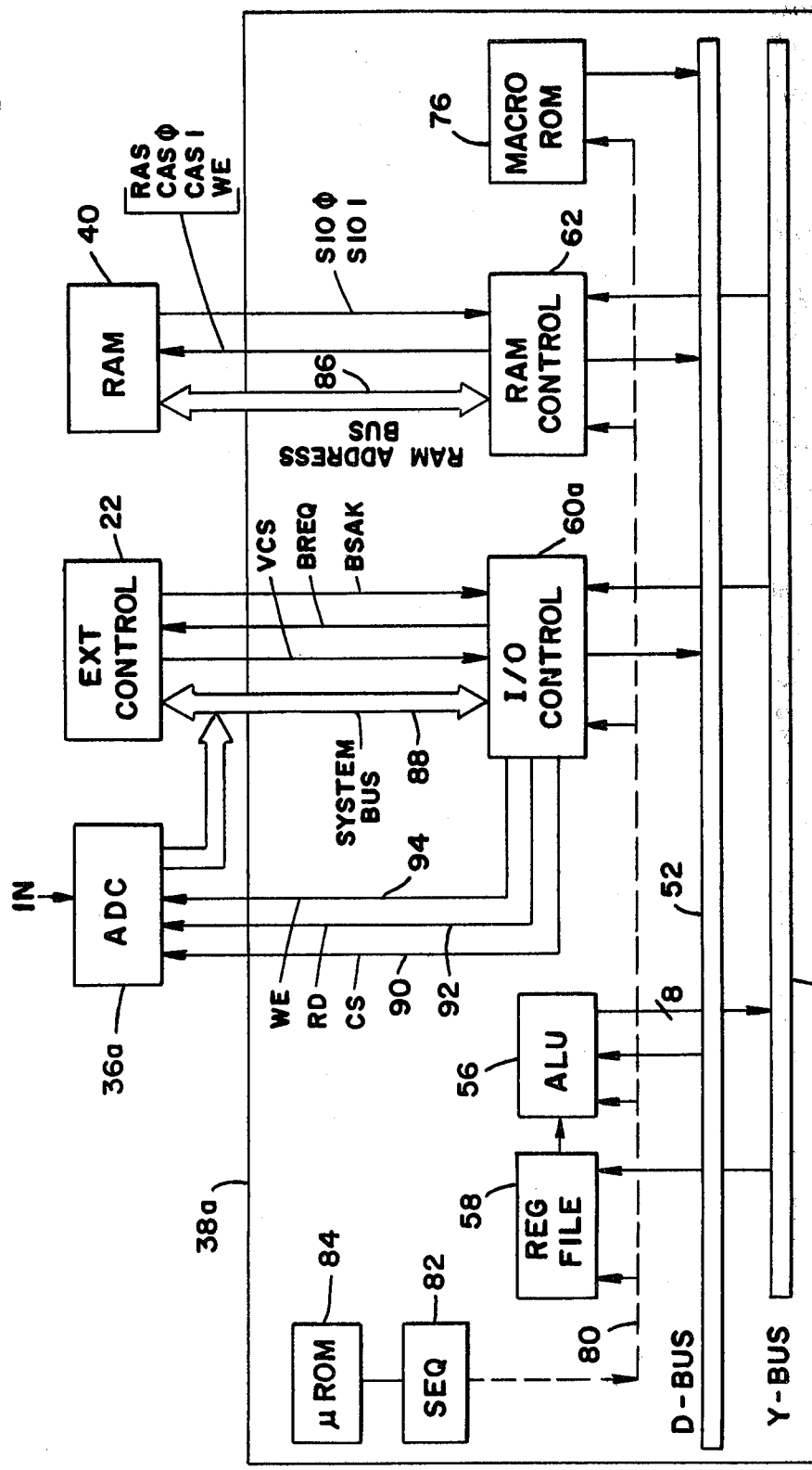

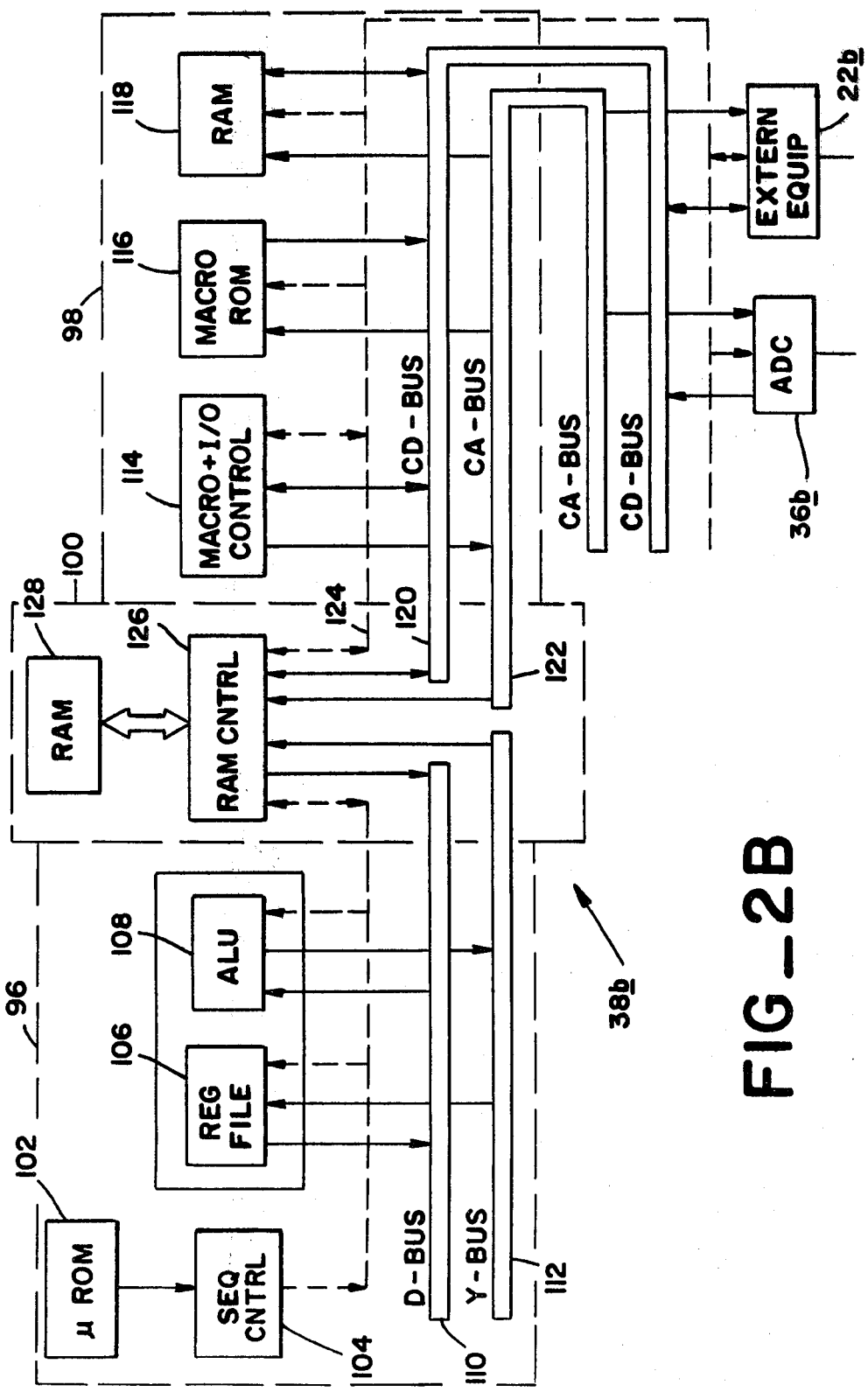
FIG_2B

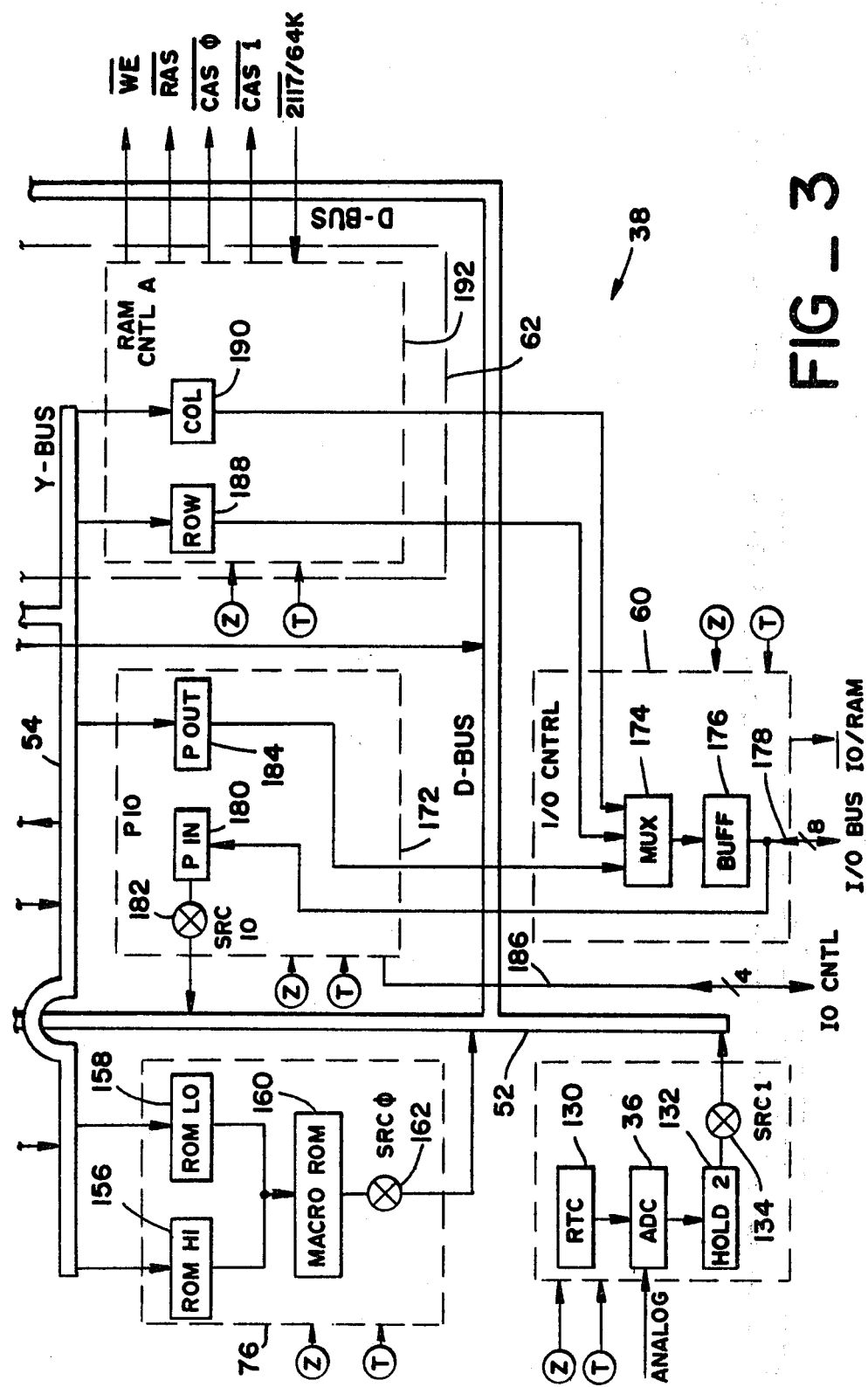
FIG_3

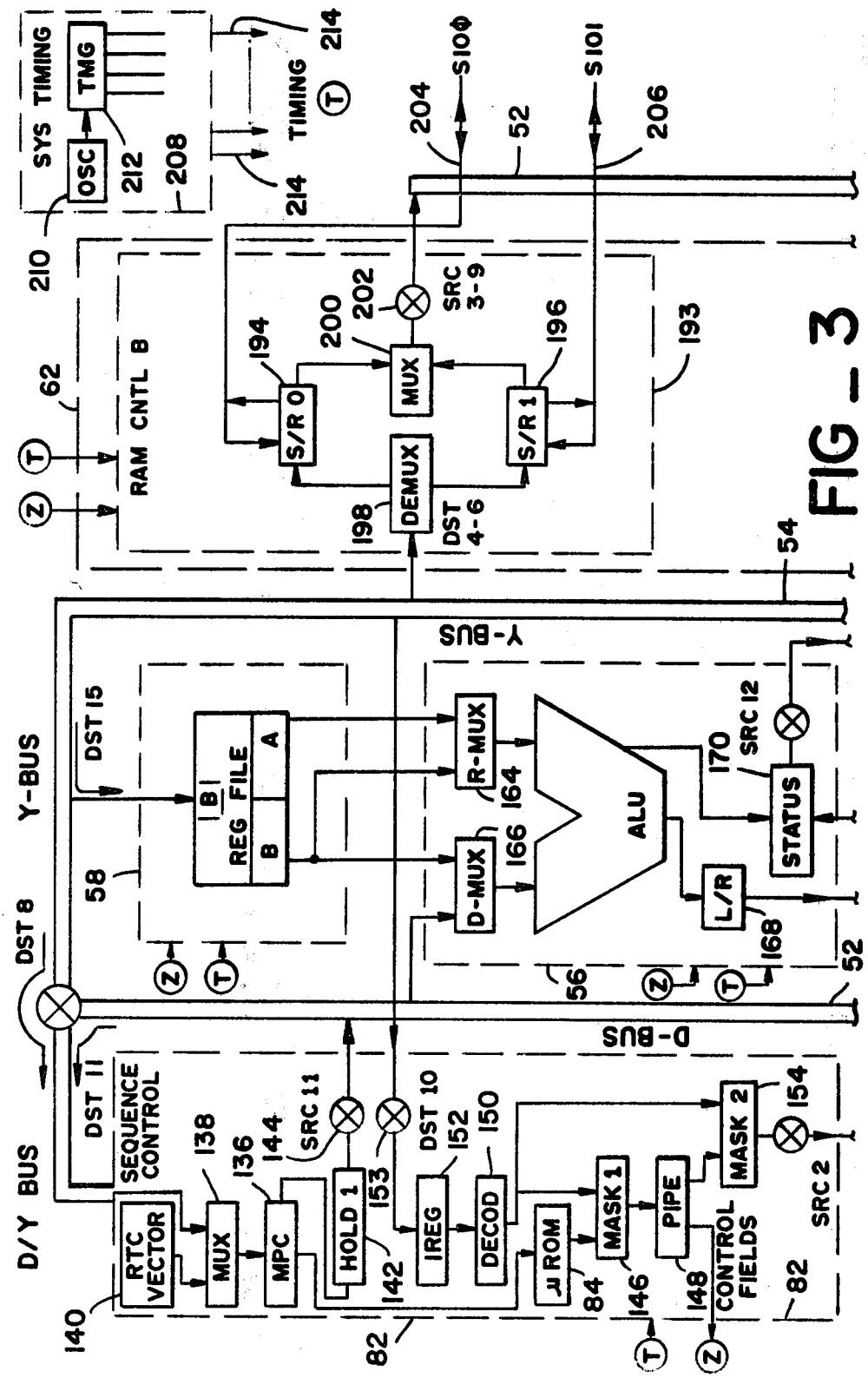
FIG_3

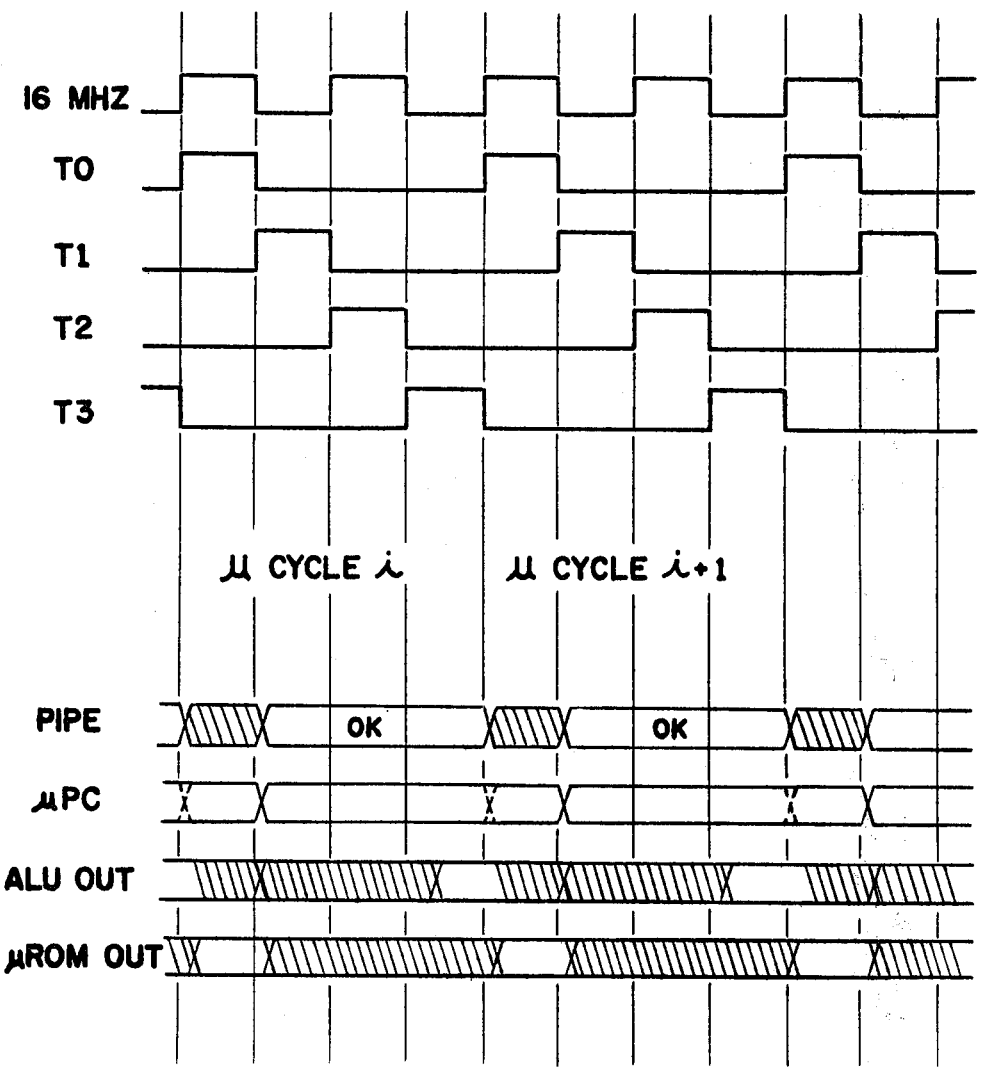
FIG_4

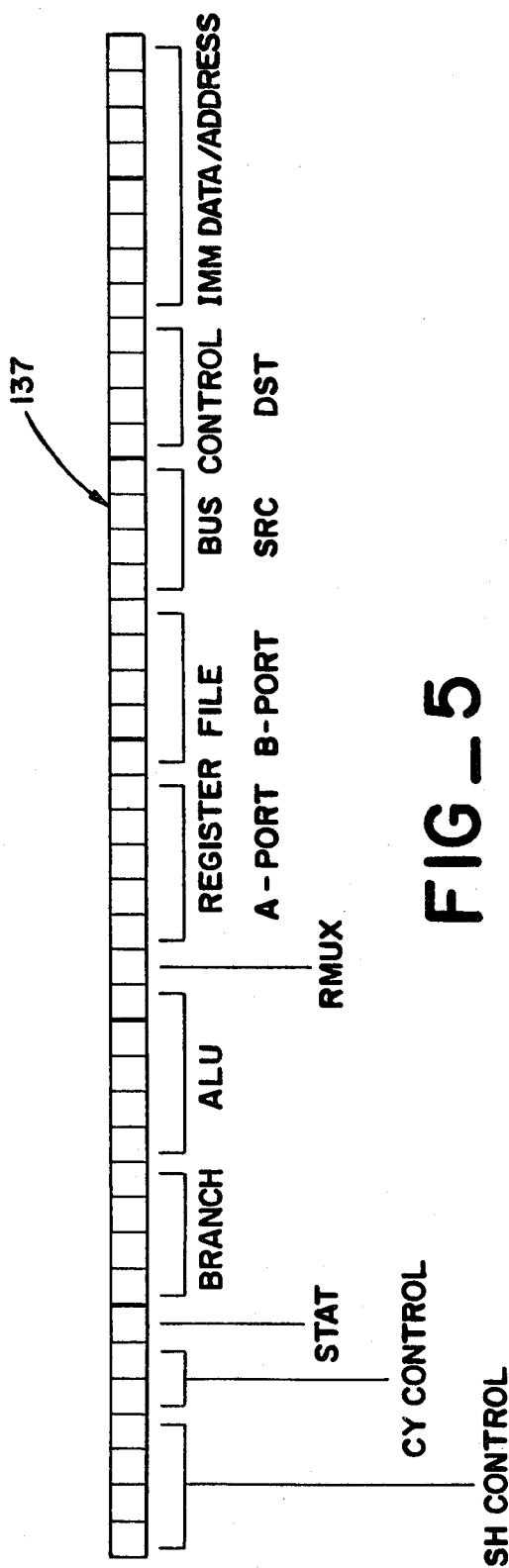
FIG_5

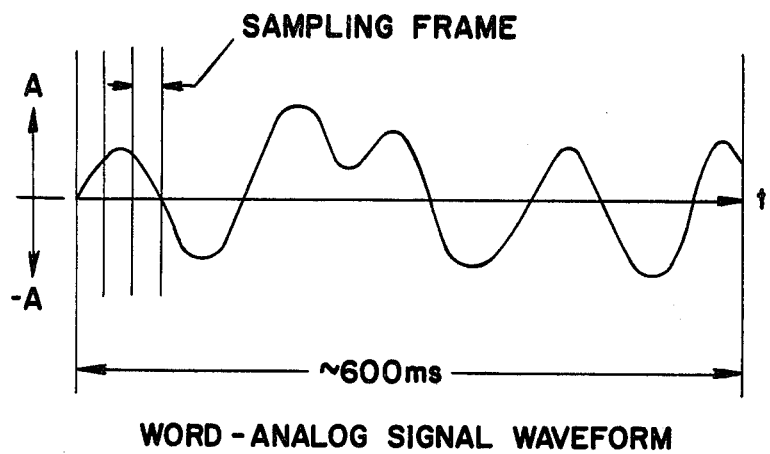
WORD-ANALOG SIGNAL WAVEFORM
FIG _ 6
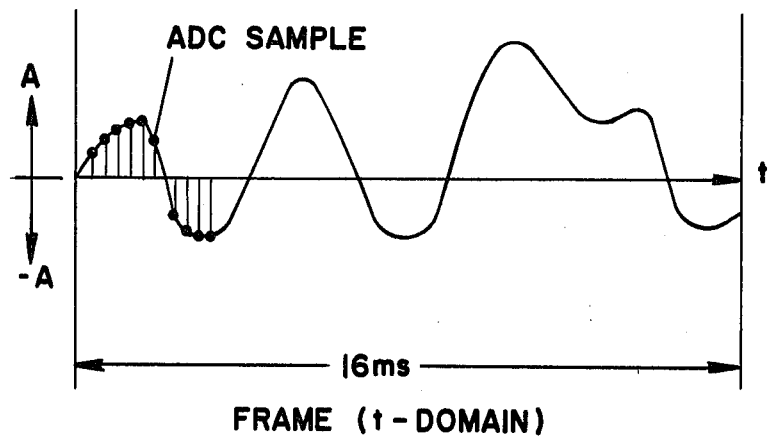
FRAME (t-DOMAIN)
FIG _ 7
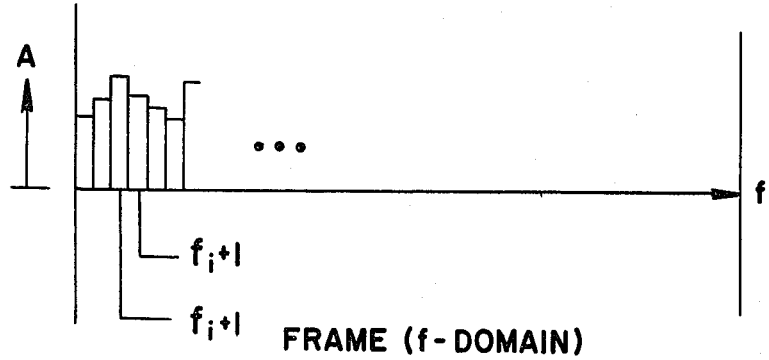
FRAME (f-DOMAIN)
FIG _ 8

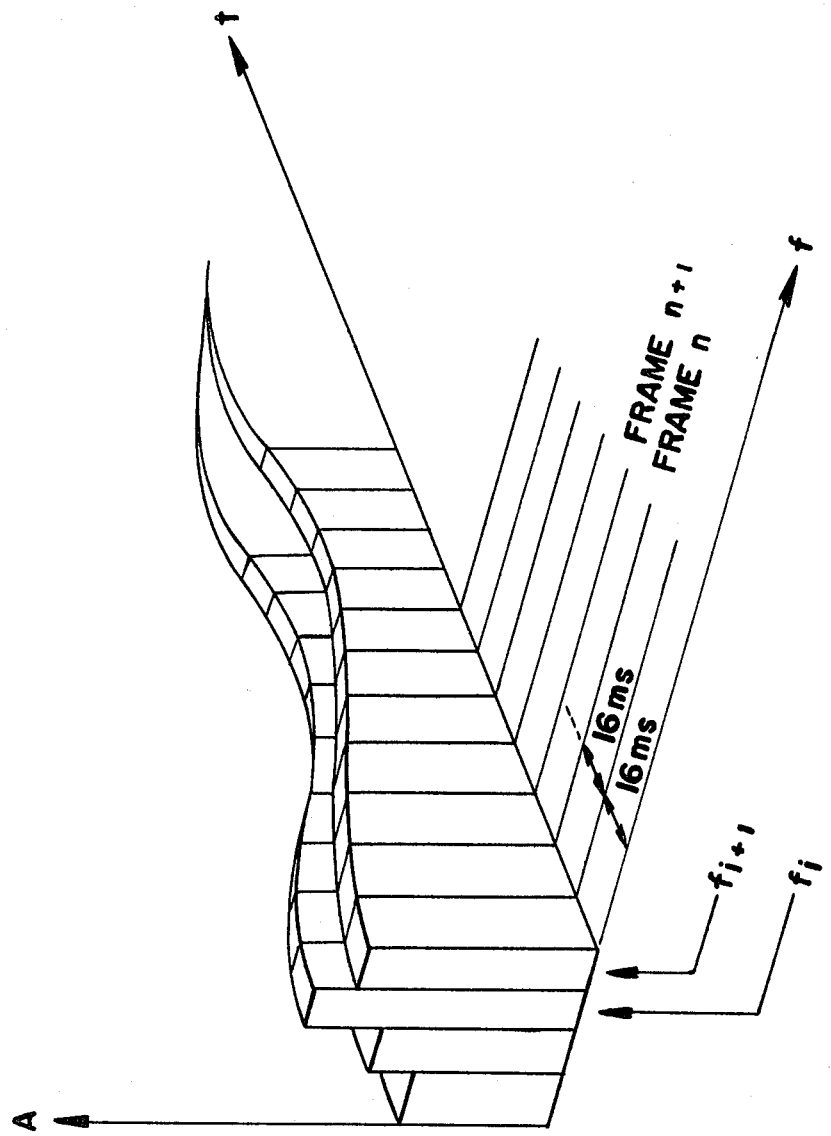
FIG._9

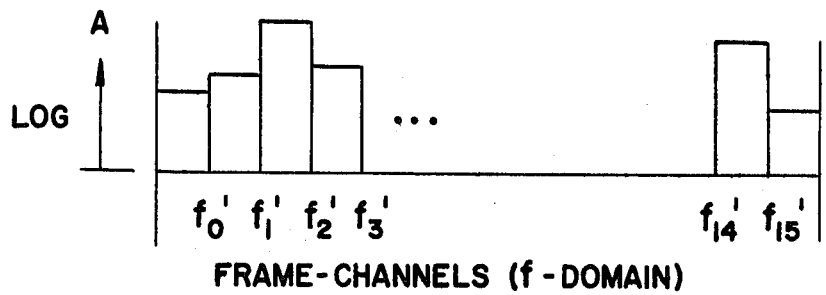
FRAME-CHANNELS (f-DOMAIN)
FIG _ 10
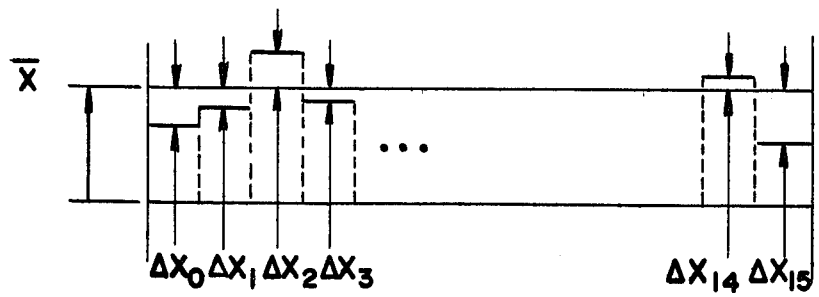
FRAME-FEATURE ENSAMBLE DOMAIN, 1
FIG _ 11
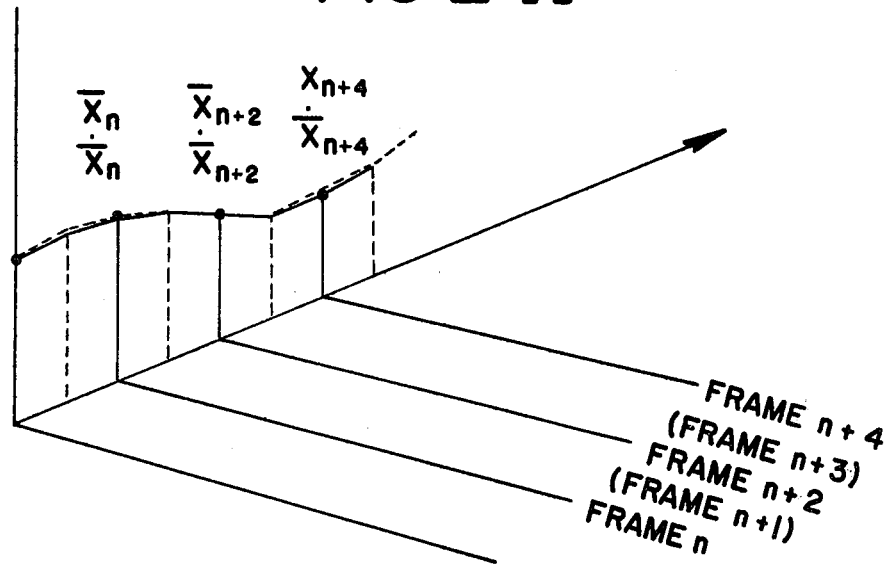
DERIVATION OF INSTANTANEOUS SLOPE OF $\bar{X}$ (I.E. $\dot{\bar{X}}$)
FIG _ 12

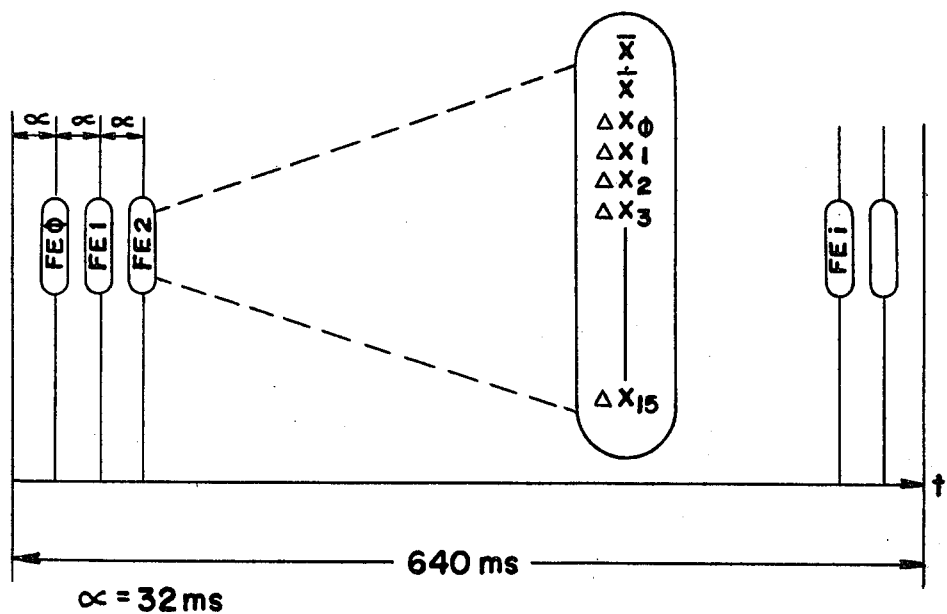
FIG_13
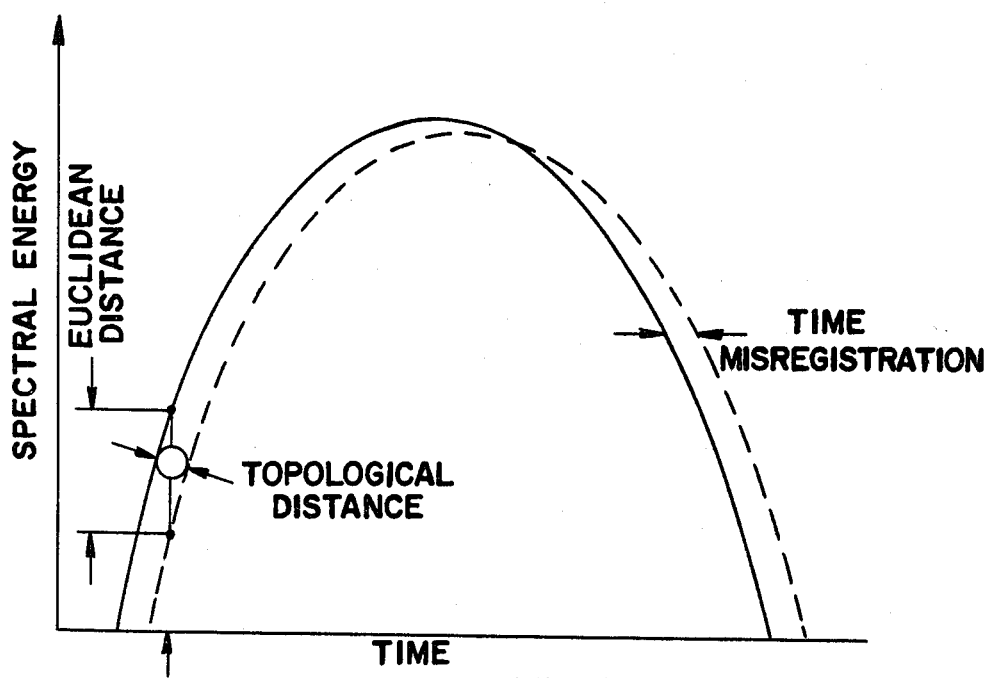
FIG_14

METHOD AND APPARATUS FOR SPEECH RECOGNITION AND REPRODUCTION

BACKGROUND OF THE INVENTION

This invention relates generally to waveform analysis and synthesis apparatus and more specifically to a method and system capable of learning a vocabulary to spoken words and subsequently recognizing these words when they are spoken, and synthetically reproducing these words as an audible voice when activated by an electronic command signal.

Recognition of human speech is extremely difficult for a machine to accomplish. The perceptual qualities and complexity of the human ear and brain far exceed the capabilities of any known or contemplated apparatus. One basic problem in speech recognition is that of extracting recognizable features from the acoustic waveform. The most widely accepted means for feature extraction is to decompose the waveform into a spectrum of audible frequencies, creating a spectrogram or "voiceprint" of voice energy as a function of both frequency and time.

Heretofore, spectrum analyzers were difficult and costly to implement on LSI (large scale integration) semiconductor chips. Prior art devices used analog electronic circuit components (such as resistors, capacitors, transistor amplifiers, detectors, etc.) to construct a bank of audio frequency filters. Each analog filter provided information on the acoustic energy in a specified frequency range. For example, Brodes (U.S. Pat. No. 3,812,291) required sixteen such analog filters, and Herscher et al (U.S. Pat. No. 3,588,363) used fourteen such analog filters. Browning et al (U.S. Pat. No. 4,087,630) disclosed a method for using a digital spin register in conjunction with a single analog filter to provide multiple channel spectrum analysis.

Another problem in word recognition involves data compaction and digital storage of the voiceprint. Brodes et al (U.S. Pat. No. 3,812,291) disclosed a binary digital data encoder depending on spectral slopes (i.e., rate of change of acoustic energy as a function of frequency). Herscher et al (U.S. Pat. No. 3,588,363) also disclosed an encoding technique depending on spectral slopes. The present invention differs from the prior art in both the substance and the form of the encoding technique by providing a binary encoding of voiceprint data which preserves amplitude information in all spectral channels, together with time rate of change of amplitude.

Pattern matching, or the comparison of one voiceprint with another, is an essential element of word recognition. This is also a difficult problem, because differences between similar words must be distinguished, while at the same time accepting the normal variations between various utterances of the same word. Normal variations include: (a) differences in amplitude due to speaking loudly or softly or moving the microphone; (b) differences in duration or tempo due to speaking slowly or rapidly; (c) differences in spectral qualities due to head colds or variations in microphone response; and (d) background noise due to nearby conversation, machine noise, poor telephone connections, or other causes.

There have been many prior art means for pattern matching designed to provide the most effective balance between discrimination of different words and acceptance of variations of the same word. A widely used means for eliminating amplitude effects is to use a logarithmic or decibel energy scale for the acoustic energy in a channel. Spectral slopes, i.e., the difference between signal levels in selected frequency channels, is independent of the amplitude or loudness of the signal. An increase in amplitude, for example, by holding the microphone closer, causes each channel to increase its level by the same logarithmic amount as measured in decibels; by utilizing only spectral differences between channels, the effect of an increased number of decibels in each channel is subtracted out. This method is used, for example, by Herscher et al (U.S. Pat. No. 3,588,363), and Brodes et al (U.S. Pat. No. 3,812,291). In the present invention an improved statistical method is used to retain information on overall signal amplitude that is normally lost by the spectral slope method.

Accounting for variations in speech tempo created yet another speech recognition problem. Prior art speech recognition techniques suitable for low cost implementation used a time-division method, whereby word start and word end are determined, and voice data was collected at fractional intervals within the word. This method accounted in a crude way for variation of the total duration of the word, but did not take into account variations in timing and tempo of syllables within a word. A far more effective technique which is difficult to implement in a low cost system is the method known as dynamic programming or dynamic time warping. Dynamic programming is a complicated pattern recognition technique which warps the time axis to provide an optimum match between words; for example, the technique arranges to match words, syllable for syllable, even when the syllables occur at different relative locations in the word. A description of this method may be found in an article entitled "Dynamic Programming Algorithm Optimization for Spoken Word Recognition" (IEEE Transactions on Accoustics, Speech, and Signal Processing, Vol. ASSP-26, No. 1, February 1978, pp. 43-49). Prior art of implementing dynamic programming in digital computers is taught in Sakoe et al (U.S. Pat. No. 3,816,722). The present invention is an improvement on the prior art method and means of dynamic programming in several areas: (a) use of a novel spectral feature comparison means to improve discrimination, noise immunity and calculation speed; (b) an optimal search technique that provides for effective pattern matching and word recognition even in the presence of noise signals comparable to the speech signals; (c) a means for implementing the method in low cost LSI semiconductor chips.

Word recognition performance in the presence of background noise, such as conversations or machine noise, has also been a major problem with prior art word recognizers. Most systems failed when the background noise was comparable to unvoiced speech sounds in the word to be recognized. The present invention has greatly reduced and in many circumstances eliminated this problem.

A general object of the present invention is to provide an improved speech or word recognition system that solves the aforesaid problems of prior art word recognition systems and methods.

Another object of the invention is to provide a word recognition system that accomplishes spectrum analysis of voice input without the need for analog filters and may be implemented on integrated circuit semiconductor (LSI) chips.

Yet another object of the invention is to provide a speech recognition system that also provides a speech synthesis capability, since it utilizes a digital process for converting an acoustic waveform into spectral components that may be reversed.

Another object of the present invention is to provide a word recognition system that is easily "trained" and requires only one entry of the spoken word, although other entries may be made for improvements in discrimination or noise immunity.

Still another object of the invention is to provide a word recognition system that is particularly effective for speaker identification and verification based on voiceprints. Since spectral channels in the present invention are based on digital means, they may be readily changed to suit the need for recognizing one word from many words spoken by the same speaker or for identifying one speaker from many individuals speaking the same word. Analog filter banks in prior art were adapted for accomplishing this only with considerable difficulty, usually requiring complicated circuit modifications.

SUMMARY OF THE INVENTION

The aforesaid and other objects of the invention are accomplished by a circuit comprised of digital processing components which function together to: (1) provide a spectral analysis of each spoken word in digital form; (2) store the encoded digital representation of the word in a memory; (3) perform a pattern matching survey to identify the digitized word form; and (4) initiate a response when the identification has been made. In broad terms, the circuit comprises an analog to digital converter for receiving the analog waveform voice input which is continuously converted to varying amplitudes of signal at evenly spaced apart time intervals. Within the circuit are bus lines to which are connected the components that process the digitized data input. The circuit is operated by a central timing system that controls the various components in a repetitive four-phase arrangement. An arithmetic logic unit (ALU) in combination with memory, such as a two-port register file, is provided to accomplish standard logic functions in the processing of data. The control and order of the various calculation functions of the circuit are maintained by a sequence control section and an input/output control subcircuit. Associated with these latter components are RAM control sections for controlling the storage and retrieval of data from external memory devices during circuit operation. In the operation of the system, a spoken word of a finite length is divided into time frames, each comprised of a preselected number of digitized data points having a particular amplitude that may be identified by 8-bit encodation. From the amplitude vs. time domain for each frame, the ALU is controlled to make calculations that convert the digitized data samples to spectral lines or frequency range coefficients. Further processing by the ALU and its related memory units transforms the spectral coefficients of each frame to a lesser number of frequency channels by a selective summation of groups of contiguous spectra. For each such frame of frequency channels a mean average ($\overline{X}$) of the logarithm amplitude is determined and from this average value the deviation of actual amplitude is measured for each channel. The processing components also measure the instantaneous slope of the mean value for each channel for pairs of adjacent frames. All of the aforesaid measured characteristics of each frame, namely, the mean value, the slope of the mean value relative to a contiguous frame, and the deviations from the mean values for the various channels, are combined with digital encoding to form a feature ensemble for each pair of adjacent frames. The total number of feature ensembles comprising a template for an entire word are stored in the external memory.

Matching a voiceprint to a stored template in accordance with the present invention is accomplished by a novel feature comparison combined with a dynamic programming optimization technique.

Other objects, advantages and features of the invention will become apparent from the following description presented in conjunction with the accompanying drawing.

BRIEF DESCRIPTION OF THE DRAWING

FIG. 1 is a general block diagram of a voice recognition and voice synthesis system embodying principles of the present invention;

FIG. 2 is a block diagram of a voice recognition circuit according to the present invention;

FIG. 2-A is a block diagram of a modified voice recognition circuit system similar to FIG. 2;

FIG. 2-B is a block diagram of another modified form of voice recognition circuit using discrete components;

FIG. 3 is a more detailed block diagram (on two sheets) of the voice recognition circuit depicted in FIG. 2, showing further features of the present invention;

FIG. 4 is a series of timing diagrams for the voice recognition system according to the invention;

FIG. 5 is a diagram showing the designation of bits for the micro-code word according to the invention;

FIGS. 6–12 are a series of diagrams illustrating the processing of a typical spoken word to form a template of a voiceprint in accordance with the principles of the invention;

FIG. 13 is a diagram showing a typical word template comprised of a series of feature ensembles with one ensemble enlarged to show its data content according to one embodiment of the invention;

FIG. 14 is a diagram illustrating the difference between metric concepts used for voiceprint feature comparison.

DESCRIPTION OF THE PREFERRED EMBODIMENT

With reference to the drawing, FIG. 1 shows in block diagram form a typical word recognition system 20 embodying principles of the present invention including provisions for external control 22 and external equipment 24. The latter may be connected to various components operable by or capable of using speech signals or to a host computer (not shown) capable of storing or transmitting voiceprint data. Also connected to the external control is a speech synthesis output path through a digital to analog (D-A) converter 26 and an amplifier 28 to a speaker 30. As depicted in general terms, the system's word recognition capabilities may be utilized with various components connected to the external equipment such as robotic devices, display devices, data retrieval and communication equipment.

The voice input to the system is applied through a microphone 32 which supplies the voice signals in analog electrical form to an amplifier 34 and thence to an analog to digital (A-D) converter 36. The latter converts the analog signals to a time sequence of binary digits by providing a binary representation of the analog voice signal at discrete sampling intervals. In one embodiment of the invention the analog voice signal is sampled 8000 times per second with a 256-level (8-bit) A-D converter; 128 samples are collected to form a frame of 16 milliseconds duration. Obviously, each spoken word will have a large multiplicity of frames.

Digital information from the A-D converter 36 is fed to a voice processor 38 which is represented by a box in FIG. 1 and which will be described in greater detail with repect to FIGS. 2 and 3. Within the processor 38, binary logic and arithmetic functions are performed on the frames of digital data and are analyzed in accordance with predetermined or programmed instructions to provide digital information on the frequency spectrum of the voice signal. Thus, the voice signal (signal amplitude as a function of time) is converted to a voiceprint (frequency content in the voice signal as a function of time).

The voiceprint contains in digital form the information required to distinguish one word from another; it also serves to identify the particular speaker, since the voiceprint of a word is unique to the person who speaks it. Voiceprints are well known to those versed in the art and have long been used for both recognition and speaker identification. The present invention provides a digital means for establishing and reproducing a voiceprint.

The voice processor 38 is connected to an external memory bank 40 which may comprise one or more random access memory devices (RAMs) 40 connected in parallel. The external control subcircuit 22 is connected by an 8-bit data line 44 to the voice processor. As previously described, an external equipment interface circuit 24 is connected by a two-way data path through a conductor 45. This interface circuit can be adapted to connect with a host computer for supplying outside data, such as preformed voiceprints, or to other equipment using speech commands, such as robotic devices, display devices, or data retrieval and communication equipment.

In FIG. 2 is shown a block diagram of the voice processor 38 which forms an important component of the present invention. Physically, it can be made of discrete elements mounted on a printed circuit board in the conventional manner, but it can also be made as an integrated circuit semiconductor device. As shown diagrammatically, an incoming lead 50 transmitting analog data is supplied to the analog to digital converter 36. In this embodiment, the A-D converter is provided as part of the voice processor circuit adaptable for implementation as a single integrated circuit device.

Within the voice processor 38 are two conductor buses, namely, the D-bus 52 and the Y-bus 54, and all of the voice processor components are connected to either one or both of these buses. The output of the A-D converter is connected to the D-bus. An arithmetic logic unit (ALU) 56, a main subcomponent of the voice processor, receives data from the D-bus and/or the register file, and supplies an output to the Y-bus after performing one of 16 arithmetic/logic operations. Associated with the ALU is a register file 58 which is essentially a two-port memory that receives input from the Y-bus and provides output to the ALU. Similarly, an input-output (I/O) control subcircuit 60 and a random access memory (RAM) control subcircuit 62 are provided for controlling the storage and retrieval of voiceprint data. Each of these latter subcircuits has an input from the Y-bus and an output to the D-bus and both have data paths 64 and 66 respectively that are connected to the common 8-bit data path 42 which extends from the voice processor to the external control circuit 22 and memory 40. In addition, request, acknowledge and grant, output ready lines 68 and 70 extend to and from the I/O control to external control, while data and control lines 72 and 74 (S10φ, S101 and RAS, CASφ, CAS1 and WE) extend from the RAM control 62 to external memory (RAM)40. A macro read only memory (ROM) 76, which includes computation tables and macro instructions, is also connected to the D-bus and provides additional memory within the voice processor circuit.

As indicated diagrammatically by the dotted lead line 80 in FIG. 2, all of the aforesaid components are interconnected, and timing control of the circuit is maintained by a sequence controller subcircuit 82 that includes a micro-ROM 84.

In FIG. 2-A is shown a somewhat modified circuit for a voice processor 38a wherein the ADC 36a is furnished external to the chip. In this embodiment, one 8-bit bus 86 is dedicated exclusively to the transfer of RAM address data to the external memory or RAM bank 40, while an additional 8-bit bus 88, called the system bus, provides the data path between the voice processor and the external control circuit 22. This latter bus 88 may also serve as the data path between the external ADC 36a and the voice processor chip. Three control lines 90, 92, and 94 (WR, RD, and CS) are provided from the I/O control 60a to the external ADC 36a. In all other respects, the voice processor 38a, using the external ADC, is substantially the same as the processor 38 with its on-chip ADC 36.

As shown in FIG. 2-B, the invention may also be embodied in an arrangement wherein a voice processor 38b is comprised of separate discrete components rather than being implemented in the form of an integrated circuit. Such a circuit, as shown, comprises three major sections, namely, a high speed computation section 96, a macro and I/O control section 98, and a common memory section 100. The high speed computation section is comprised of a micro ROM 102 connected to a sequence controller 104, a register file 106, and an ALU 108. In a typical implementation these latter two components may be comprised of four identical high speed bit slice microprocessor elements, plus their support components. The high speed computation components are interconnected by two buses 110 and 112 (D and Y) which also provide interconnection with the common memory section 100.

The macro and I/O control section 98 comprises a microprocessor 114 and associated system components including a macro ROM 116 and a volatile (scratchpad) RAM 118 which are interconnected by a pair of busses 120 and 122 (CD and CA) and a plurality of control lines indicated by the dotted line 124. Also connected to the buses CD and CA is an analog to digital converter (ADC) 36b, and other external equipment 22b adapted to interface with external using apparatus or devices.

The CA and CD buses also provide a means for accessing the common memory 100 which is comprised of a RAM control circuit 126 and a main memory 128, such as a 32k RAM. As previously described, the RAM control is also connected to the computation section 96 through the D and Y buses. In all other functional respects, the circuit of FIG. 2-B is the same as those of FIGS. 2 and 2-A.

Turning to FIG. 3, the voice processor 38 will now be described in greater detail with an explanation of the relationship and function of the components.

The components indicated by a single block in FIG. 2 are expanded in FIG. 3 and each is surrounded by a dotted line to include subcomponents.

The A/D converter 36 is connected to and receives an input from a real time clock interrupt (RTC) 130. The A/D output is supplied to a register (HOLD 2) 132 whose output passes through a switch (SRC1) 134 to a branch of the D-bus 52.

In the sequence controller 82 a micro program counter (MPC) 136 presents an address to the micro-ROM 84 to specify the next micro code word that is to be fetched. As shown in FIG. 5, a micro code word 137 consisting of a specified number of bits of information (e.g., 43 bits) is provided to control the operation of the voice processor during one cycle and is described in greater detail below. The counter 136 may be incremented, or parallel loaded from the output of a multiplexor 138. Under micro program control, this multiplexor passes either a real time clock (RTC) vector 140 or the contents of the D/Y bus to the micro program counter 136. The output of this counter is also connected to a holding register (HOLD 1) 142 in which the current value of the counter may be temporarily saved. The output of register 142 connects with the D-bus via a bus switch 144. The output of the micro-ROM 84 is gated through a logic network (MASK 1) 146, into a PIPE register 148. Another path through the MASK 1 into the PIPE register originates at another logic network (DECOD) 150 which decodes the macro instruction contained in a register (IREG) 152. The IREG register is loaded from the Y-bus through a switch (DST 10) 153.

The contents of the PIPE register control the operation of the system by way of specific control fields and their associated decoders. These decoders (not shown) generate control signals for all the system components, such control signals being indicated by the letter "Z". Micro-code flow control is effected by means of another dedicated field in the micro code word. The contents of this latter field are either (a) logically combined with the output of the macro instruction decoder (DECOD) via a logic network (MASK 2) 154 or (b) brought directly out through MASK 2 without modification and onto the D-bus 52.

The macro-ROM block 76 comprises a ROM Hi register 156 and a ROM Lo register 158, both receiving inputs from the ALU 56 via the Y-bus 54. The outputs of ROM Hi and ROM Lo registers are both furnished to a macro-ROM subcircuit 160 which is connected through a switch (SCR$\phi$) 162 to the D-bus.

The register file 58 is essentially a 2-port random access memory whose input is from the Y-bus. An A-port specifies the register whose contents are to be presented to an R-multiplexor 164 and the B-port specifies the register whose contents are to be presented to both multiplexors 166. The D-multiplexor is also connected to the D-bus 52. The D and R multiplexors each have outputs that are connected to the arithmetic logic unit (ALU) 56 which comprises circuitry to perform the basic logic arithmetic functions for the system. The output of the ALU is connected to a logic network to perform one or more shift operations, an (L/R circuit) 168 whose output in turn is connected to the Y-bus. Another output from the ALU is connected to a status device 170 which provides an output through switch SRC 12 and also receives an input from either the ALU or the Y-bus.

The I/O control 60 and its parallel I/O Port (PIO) 172 are components that control the flow of data to and from the external memory. The I/O control comprises a multiplexor 174 whose output is connected to a buffer 176 whose output in turn is connected to an 8-bit I/O Bus 178. This latter bus is also supplied to a parallel input (PIN) circuit 180 of the parallel I/O Port whose output is supplied through a switch (SRC 1$\phi$) 182 to the D-bus. The parallel I/O Port also has a POUT circuit 184 whose input is from the Y-bus and whose output is furnished to the multiplexor 174. The parallel I/O Port also is connected to a 4-bit I/O control line 186.

The multiplexor 174 also receives inputs from ROW and COL registers 188 and 190 in the first section 192 of the RAM control circuit 62. These ROW and COL registers are each connected to the Y-bus so as to receive inputs from the ALU.

A second section 193 of the ROM control 62 comprises two 12-bit shift registers 194 and 196, a demultiplex network (DEMUX) 198 for loading the shift registers from the Y-bus and a multiplex network (MUX) 200 for unloading the shift registers onto the D-bus through a switch (SCR 3-9) 202. The shift registers are connected with the RAM array by serial input/output lines (SI0$\phi$ and SI01) 204 and 206. The manner in which these components are interconnected permits information transfer between the voice processor and the RAM array 40 in several different formats. For example, the contents of the two shift registers may be treated as three 8-bit quantities or four 6-bit quantities. Each 6-bit quantity may, in turn, be treated as two 3-bit quantities at the time such a 6-bit quantity is unloaded from the shift registers through the MUX 200 onto the D-bus. These formats are related to the requirements of the voice processing algorithms, described in detail elsewhere.

To synchronize the multiplicity of the events throughout the voice processor, a timing generation network (SYS TIMING), designated block 208, is provided. It comprises a master oscillator (OSC) 210 that operates at 16 MHz and drives several counter and decoder stages (TMG) 212 with appropriate timing output (T) leads 214.

The voice processor 38, as shown in FIG. 3, and as just described, can be readily implemented as a single semiconductor chip integrated circuit using known integrated circuit technology such as CMOS, N-Channel MOS, P-Channel MOS or bipolar type design rules.

The operation of the voice processor 38 will now be described relative to the various components which are interconnected by the D-bus, the Y-bus, a dedicated D/Y Bus terminating in the sequence controller 82, and a variety of timing and control signals collectively identified by (T) and (Z), respectively.

As shown in the timing diagram of FIG. 4, the (TMG) stages 212 generate four, non-overlapping, 25% duty cycle T-states in an endlessly repeating timing chain ($T_o$, $T_1$, $T_2$, and $T_3$). The rising edge of $T_o$ defines the beginning, the falling edge of $T_3$ the end of a basic machine cycle (Microcycle). The various T durations and the rising and falling edges of $T_o$, $T_1$, $T_2$ and $T_3$ define the time boundaries, within every microcycle, which signify the beginning, duration or termination of discrete intra-cycle events. The shaded areas indicate time periods when the data is in transition and may not be stable.

As indicated on the lower portion of FIG. 4, the rising edge of $T_0$ signifies the start of information transfer from the output of the micro-ROM to the PIPE, the falling edge of $T_0$, the completion of this transfer. The rising edge of $T_1$ signifies the start of micro-ROM access. The interval from this edge until the falling edge of $T_3$ is the micro-ROM access time. Data sourcing components begin gating data onto the D-bus sometime during $T_0$ and keep gating this data onto the D-bus until the rising edge of the next $T_0$. The ALU performs its operation(s) on the data being presented to its inputs starting sometime during late $T_0$, early $T_1$, and produces a stable output on the Y-bus by not later than mid-$T_3$. The falling edge of $T_3$ clocks the contents of the Y-bus into the specified destination latch. This completes the sequence of intra-cycle events.

In synchronism with the aforementioned system timing, the sequence control block specifies the information flow which takes place between the several component blocks of the system. This is accomplished by both the code pattern of each micro code word and the sequence in which these words are executed. During any one machine cycle, called a micro-cycle, the microcode word currently contained in the PIPE register 148 is executed while the next word is being fetched (accessed) from the micro code ROM 84. At the end of a micro cycle, the new word emerging from the micro code ROM is latched into the PIPE, to be executed during the following micro cycle. The micro code word contains a number of control fields, each comprising a specified number of bits. These fields are decoded during the execution of the micro code word to provide the necessary control impulses throughout the processor 38.

The start of a sequence of micro code words, as well as the particular series in which several sub-sequences are to be executed, may be specified by a macro instruction. Such a macro instruction is fetched from the macro-ROM 76 and held in the IREG 152 for the duration of the execution of all the micro code words which comprise the entire sequence that effects the operational intent of the macro instruction. By means of DECOD and MASK 1 and MASK 2 logic, the sequence controller 82 is paced through the appropriate sequence implied by the macro instruction currently residing in the IREG.

Information flow between the several voice processor components transpires over the data/address buses except in the case of register file to ALU transfers. In the latter instance, dedicated data paths are provided. All sources for information transfers gate such information onto the D-bus except in transfers from register file to ALU. All destinations for information transfers receive such information off the Y-bus, with the exception of the micro program counter 136 which receives such information off the D/Y-bus. The latter bus may be viewed as an extension of either the D-bus or the Y-bus, as the case may be, during information transfers involving the micro program counter.

All information transfers from one source to a destination, including transfers from register file 58 to some destination or back into the register file, are routed through the ALU. The only exception to this rule is a transfer from the D-bus, via D/Y-bus, to the MPC. The ALU may be directed to merely "pass through" the contents at the D-bus to the Y-bus without performing a logical or arithmetic operation on the information in transit, or it may be directed to perform a logical or arithmetic operation on such information in transit and output the result of said operation to the Y-bus. The ALU performs such operations on two 8-bit quantities presented to it by the outputs of the D-MUX 166 and the R-MUX 164. In turn, the D-MUX may be directed to select either the D-bus or the B-Port of the register file as its information source, while the R-MUX may be directed to select the output of either the A-Port or the B-Port of the register file. The result of the ALU operation is output onto the Y-bus, whence it is routed to its destination.

The external dynamic RAM array 40 provides the mass memory in which all the voice processing information is held during the spectral analysis, template packing, and word recognition phases. This RAM array is interconnected by means of the two serial I/O lines 72, which provide the data path, and the I/O bus, over which the address information is output to the array. Data is exchanged between the two 12-bit shift registers 196 and 198 and the RAM array, while addresses are set up via the ROM and COL registers 188 and 190. During a typical voice processor to RAM array transfer, the shift registers are loaded up with the information that is to be sent to the RAM and then the ROW and COL registers are loaded with the starting address for the impending transfer. ROW address is sent first, followed by COL address. RAM CNTL 62 and I/O CNTL 60 then transfer ROW and COL addresses to the RAM array and activate the requisite array control lines (i.e., WE, RAS, CAS$\phi$, and CASI) to effect the actual double bit serial information transfer.

A RAM array to voice processor transfer is largely a repeat of the aforementioned operation, with a few exceptions. ROW and COL are set up as before, and information is clocked from the RAM array into the voice processor shift registers. From there the information is gated onto the D-bus and routed through the ALU where it is operated upon in accordance with the voice processing algorithm before being transferred to the register file for temporary storage. The information being gathered in the register file is, in turn, operated upon in conjunction with additional information having been input from the RAM array at some other time, and the resultant transformed information is again sent to the RAM array.

This is an iterative, highly recursive process, both during spectrum analysis and pattern match operations. Thus, the hardware structure in RAM CNTL 62 (A & B) and I/O CNTL 60, as well as the data structure underlying the location of all the information in the RAM array, has been tailored to optimize throughput.

The I/O Bus over which COL and ROW address information is output to the RAM array 40 also serves as a general purpose I/O Port through which the voice processor may communicate with an external controller. P10 Bus access contention is resolved through the use of a fully interlocked, asynchronous bandshake protocol implemented through the I/O CNTL signals (BREQ, GRT, ORDY, ACK). For purposes of this type of P10 transaction PIN served as an input, POUT as an output latch for the information being transferred.

The original source of the digital information, which undergoes transformation as a result of the operations described above, is the analog to digital converter (APC) 36. This converter samples the analog waveform input to the voice processor at precise intervals and converts these samples into digital notation corresponding to the instantaneous amplitude of the sampled waveform at the time the sample was taken. The interval between samples is controlled by the real time clock (RTC) circuitry.

The RTC logic interrupts the sequence control logic and causes the RTC interrupt service routine to be executed. This routine is responsible for saving machine context, accessing the ADC 36, via HOLD 2, transferring the latest conversion result into RAM and restoring machine context so that the previously preempted background task may resume execution.

Each conversion result is transferred to the RAM array in accordance with the rules governing the data structures in the array.

During the time interval in which the current samples are being taken, converted into digital form and collected in the RAM array, all of which involves the periodic foreground activation of the RTC interrupt service routine, the collection of samples from the previous interval are being processed by a background task which performs a time to frequency domain transformation and subsequent voiceprint feature extraction. The processes which are responsible for this transformation and feature extraction are described in detail in the following section.

Digital Spectrum Analysis

The major components of the voice processor 38, as described in the previous section, function to process voice signals in the form of a time sequence of binary digits to provide digital information on the frequency spectrum of the voice signal. Thus, the voice signal (signal amplitude as a function of time) is transformed into a voiceprint (frequency content in the voice signal as a function of time). The voiceprint contains in digital form the information required to distinguish one word from another; it also serves to identify the particular speaker, since the voiceprint of a word is unique to the person who speaks it. Voiceprints are well known to those versed in the stat-of-the-art and have long been used for both recognition and speaker identification. The present invention provides a digital means for obtaining the voiceprint.

The analog-to-digital converter 36 provides a binary representation of the analog voice signal at discrete sampling intervals; a collection of sampled voice signal data in binary form is aggregated into a frame. In the preferred embodiment of the invention the analog voice signal is sampled 8000 times per second with a 256 level (8-bit) A-D converter; 128 samples are collected to form a frame of 16 milliseconds duration.

To help explain the method of digital spectrum analysis according to the invention, a series of representative diagrams is provided to show the processing steps for a single word. Thus, FIG. 6 represents a highly idealized analog signal waveform plot of amplitude vs. time for a typical spoken word having a finite length of 640 milliseconds and comprised of 40 frames of 16 milliseconds each.

The number N of samples in the frame is taken to be a power of two:

$$N = 2^{p+1} \quad (1)$$

In the preferred embodiment N=128 and p=6. The sequential member of a voice signal sample within the frame may be expressed as a binary number k which is p binary digits long:

$$k = k_p 2^p + k_{p-1} 2^{p-1} + k_{p-2} 2^{p-2} \ldots k_o \quad (2)$$

Here $k_p, k_{p-1}, \ldots k_o$ are binary digits, either 0 or 1, representing in aggregate the number k expressed in binary form.

In FIG. 7 one frame of data is shown covering 16 milliseconds of time divided into 128 equal increments of 125 microseconds each. At each time increment is an amplitude value of the voice signal at that instant represented by an 8-bit digital signal. As indicated, these amplitude values may vary either positively or negatively from a base level during the time period of the frame depending on the voice characteristics of the speaker and the word being spoken.

The digital processing method of the present invention serves to convert the voice signal data to a sequence of spectral amplitudes, as shown graphically in FIG. 8. Each amplitude, which may be represented as a complex number, describes the magnitude and phase of a particular frequency component of the voice signal. Each spectral component is represented by new oscillating time functions closely resembling conventional sine and cosine functions, but having simplified binary representations. These new functions allow a substantial reduction in the digital processing steps required to transform from voice signal data to spectral amplitude data.

The new oscillating time functions may be represented as complex operations on the binary digits ($k_p, k_{p-1}, \ldots k_o$) representing the time sequence k and the binary digits ($n_p, n_{p-1} \ldots n_o$) representing the frequency sequence n. In general, the functions are given by $$V(n,k) = \exp\left[j\pi\left(\sum_{r=0}^{p}\sum_{t=0}^{m} n_{p-r}k_{r-t}2^{-t} + \phi\right)\right] \quad (3)$$

The parameter m may range from 0 to p; each choice provides a selection of spectral time functions. The lowest values of m require the minimum amount of data processing at the cost of some degradation in spectral purity. The phase correction term $\phi$, which may be zero, is symmetrically dependent on k and n. Elements of expression (3) may be defined as follows:

m = parameter (o-p)
r = an index for the summation
t = an index for the summation
p = top of range (6)
k = time sequence index
n = frequency sequence index The preferred choice of time function parameters providing the most satisfactory compromise between spectral purity and computation speed for the preferred embodiment is m=3 and:

$$\phi = 2^{-m} \sum_{r=0}^{p} n_{p-r} k_{r-m-1} \quad (4)$$

The transformation from voice signal data to spectral data is accomplished by methods similar to those known in the art as "fast fourier transforms" (see for example, E. O. Brigham, *The Fast Fourier Transform*, Prentice-Hall, 1974), except that the new functions require computations which may be accomplished using only the operations of add, subtract, and transformation by table look up. The resulting spectral analysis is substantially faster than a fast fourier transform, and may be implemented in low cost LSI since general multiplication logic is not required.

The processing operations are most conveniently represented as complex arithmetic operations on a complex data array A; this array is a sequence of N memory locations, each location comprising a 16-bit real number and a 16-bit imaginary number.

The first step in the spectral analysis is to transfer the voice signal data to the processing array:

$$A^o(k_p, k_{p-1} \ldots k_o) = Z(k_p, k_{p-1}, \ldots k_o) \quad (5)$$

Here Z represents the voice data, which is a sequence of N real numbers, and the superscript o represents that $A^o$ is the original or starting point of the process. Starting from the original sequence of voice samples, one bit of the spectral sequence n is substituted for one bit of the time sequence k. The process takes p+1 steps, corresponding to the number of bits to describe the sequences. Each step in the process is based on the results of the prior step, and may be most conveniently represented by complex arithmetic operations:

$$A^{r+1}(n_o, n_1, \ldots n_r, k_{p-r-1}, \ldots k_o) = \sum_{k_{p-r}=o}^{1} A^r(n_o \ldots n_{r-1}; \quad (6)$$

$$k_{p-r} \ldots k_o) \cdot \exp\left[j\pi n_r \left(\sum_{t=o}^{m} k_{p-r-t} 2^{-t} + k_{p-r-m-1} 2^{-m}\right)\right]$$

The last step of the process consists of transferring the contents of the processing array in bit-reversed order to the desired sequence S of complex spectral amplitudes:

$$S(n_p, n_{p-1}, \ldots n_o) = A^{p+1}(n_o, n_1, \ldots n_p) \quad (7)$$

In the preferred embodiment, the operations described above reduce to addition, subtraction, and multiplication by three quantities: sin (45°), sin (22.5°), and sin (67.5°). Since these multiplications are by fixed quantities and there are so few of them, the multiplications are accomplished in the preferred embodiment by table look up. Other multiplication techniques, such as precompiled shift-and-add operations may also be used. These operations are extremely fast compared to the multiplication processes required in the fast fourier transform methods, and are also simpler to implement in digital logic.

When the bit substitution process is complete, the voice signal sequence is transformed into a sequence of 128 spectral amplitudes as shown in FIG. 8. This process is repeated for each 16 millisecond frame in the voice signal to generate a voiceprint comprising a series of spectral amplitudes. Each frame represents 16 miliseconds time duration and 128 spectral amplitudes; this collection of voiceprint data is shown graphically in FIG. 9.

The digital processing means described above for obtaining the spectrum of a voice signal is reversible. As described, the method processes a voice signal in the form of a time sequence to provide a sequence of spectral amplitudes. It may be shown that if the same process is used on the sequence of spectral amplitudes, the original voice signal in the form of a time sequence is reconstituted.

The reversed processing operations are performed in the same manner as the spectrum analysis process, using the complex data array A. The first step in the process is to transfer the provided sequence S of complex spectral amplitudes to the processing array:

$$A^o(n_p, n_{p-1}, \ldots n_o) = S^*(n_p, n_{p-1}, \ldots n_o) \quad (8)$$

Here S* represents the complex conjugate of the provided sequence S. Starting from the original sequence of spectral amplitudes, one bit of the time sequence k is substituted for one bit of the frequency sequence n. Each step in the process is based on the results of the prior step:

$$A^{r+1}(k_o, k_1, \ldots k_r, n_{p-r-1}, \ldots n_o) = \sum_{k_{p-r}=o}^{1} A^r(k_o \ldots k_{r-1}; \quad (9)$$

$$n_{p-r} \ldots n_o) \cdot \exp\left[j\pi k_r \left(\sum_{t=o}^{m} n_{p-r-t} 2^{-t} + n_{p-r-m-1} 2^{-m}\right)\right]$$

The process takes p+1 steps, corresponding to the number of bits to describe the sequences. The last step of the process consists of transferring the contents of the processing array in a bit-reversed order to the desired sequence Z of real-valued time waveform amplitudes:

$$Z(k_p, k_{p-1}, \ldots k_o) = Re\ A^{p+1}(k_o, k_1, \ldots k_p) \quad (10)$$

The reconstituted voice signal may be converted to an analog signal means of an analog-to-digital (D/A) converter. By the addition of the D/A converter 26 to the system as shown in FIG. 1, it is therefore possible to combine voice synthesis capability with voice recognition capability. This combination of voice output, using shared digital processing means, is a unique feature of this invention.

Voiceprint Feature Extraction for Recognition

In the preferred embodiment the voice signal is decomposed into 128 spectral amplitudes for each 16 millisecond frame. This degree of refinement of spectral information is more than required for most voice recognition or synthesis applications, and voiceprint storage memory requirements may be reduced by effective feature extraction and data compaction.

Methods of voiceprint data compaction differ depending on whether the voiceprint is to be used for voice recognition or voice synthesis. The problem associated with data compaction for voice recognition is to preserve those features of the voiceprint necessary for accurate voice recognition while ignoring those qualities relating to speaker variations in tempo and amplitude. The method must also be robust in the presence of background noise. The present invention substantially exceeds the prior art in recognition accuracy in the presence of noise.

Voiceprint data from the preferred embodiment of the voice processor 38 is in the form of 128 spectral amplitudes. These amplitudes are collected together into spectral channels selected on the basis of psychoacoustic information content as determined by experiment and by cost/performance goals. In the preferred embodiment 16 channels are selected for general purpose recognition. Allocation of spectral data to a particular channel is accomplished on the basis of spectral energy content. That is, the amplitudes are squared by means of a binary look up table in which x is replaced by $x^2$, and then summed together to provide total spectral energy in the channel. This energy value is then converted to a decibel scale known by those skilled in the art to be most suitable for representation of voice spectral information.

As shown in FIG. 10, the amplitude vs. frequency data of each frame is compacted, that is, the 128 spectral lines are reduced to 16 channels by summation of groups of contiguous spectra and the amplitude values are converted to a decibel scale.

At this point, the digital voiceprint data in the preferred embodiment comprises 16 channels of spectral energy data per 16 msec frame of voice signal, expressed on a decibel scale. The data is then time smoothed, using well known prior art digital smoothing techniques. The smoothed voiceprint data is denoted by $x_k^j$, where j represents the spectral channel index (ranging from 0 to 15) and k represents the frame index (incremented every 16 msec). Every other frame (that is, every 32 msec in the preferred embodiment) the time average spectral amplitude $\bar{x}$ and the time rate-of-change $\dot{x}$ of each spectral amplitude is extracted:

$$\bar{x}_k^j = (x_{k+1}^j + 2x_k^j + x_{k-1}^j)/4 \quad (11)$$

$$\dot{x}_k^j = (x_{k+1}^j - x_{k-1}^j)/2 \quad (12)$$

Further reduction in the number of binary bits required to store the voiceprint feature data may be accomplished by well known techniques of encoding, such as storing the spectral mean, and the deviations of each channel from the mean. Thus, we may have:

$$\bar{x}_k^j = \bar{\bar{x}}_k + \Delta x_k^j \quad (13)$$

$$\dot{x}_k^j = \dot{\bar{x}}_k + \Delta \dot{x}_k^j \quad (14)$$

The spectrum averages are defined as:

$$\bar{\bar{x}}_k = \frac{1}{16} \sum_{j=0}^{15} \bar{x}_k^j \quad (15)$$

$$\dot{\bar{x}}_k = \frac{1}{16} \sum_{j=0}^{15} \dot{x}_k^j \quad (16)$$

Deviations of each feature from the average, $\Delta \dot{x}_k^j$ and $\Delta x_k^j$, require less bits to store than the original feature.

Amplitude normalization is required for effective voice recognition. Variations in overall voice amplitude, as for example, from speaking loudly or softly, or from moving a microphone closer or farther, are ignored in human conversations. In the decibel scale, a variation in overall amplitude of the speech level is represented by an additive constant in the spectral amplitudes. Whenever data is processed by means of subtracting spectral amplitudes, the constant is removed, and the resultant is automatically independent of speech level. Thus, the time rate of change features $\dot{x}_k^j$ and the spectral difference features $\Delta x_k^j$ and $\Delta \dot{x}_k^j$ are automatically normalized with respect to variations in speech level. The only voiceprint data in which voice level remains is the spectrum amplitude average $\bar{\bar{x}}_k$. This invention provides a normalized average $\hat{x}_k$, normalized by means of the peak amplitude P of the word:

$$P = \max \{\bar{\bar{x}}_k\} \quad (17)$$

$$\hat{x}_k = \bar{\bar{x}}_k - P \quad (18)$$

Since the spectral amplitude $\hat{x}_k$ is represented as a difference between peak level and actual level, it is automatically independent of speech level. The normalizing parameter P, being based on averages both in frequency and time, is insensitive to statistical fluctuations in spectral amplitude.

We will assume in the remainder of this disclosure that the acoustic features $\bar{x}_k^j$ and $\dot{x}_k^j$, as described in equations (13) and (14), have been normalized and hence are independent of speech level.

FIG. 11 shows a diagram for a single frame illustrating feature ensemble domain, part 1, wherein the amplitude values of FIG. 10 have been used to determine a normalized channel mean value $(\bar{X})$ and a deviation from this mean value $(\Delta X_j)$ for each channel is obtained.

In FIG. 12, a three dimensional plot illustrating the feature ensemble domain, part 2, is shown wherein the successive frames for the word (such as shown in FIG. 6) are arranged in order according to their time sequence. Now, for each channel, the maximum amplitude value at the midpoint of each frame is connected to that of the adjacent frame and the instantaneous slope of the mean value $\bar{X}$ (i.e., $\dot{\bar{X}}$) is determined for each frame. This feature ensemble domain is compressed to occupy a 32 millisecond slice in the time domain.

Word Recognition

Digital processing means as described above are used to convert a voice signal into a voiceprint. The voiceprint comprises a time sequence (data every 32 msec in the preferred embodiment) of time averaged spectral amplitude and time-rate-of-change of spectral amplitude in each of 16 spectral channels.

A person trains the unit by creating and storing digital voiceprints. Each voiceprint incorporates the unique spectral characteristics of both the speaker and the word being spoken. A minimum of one training voiceprint, called a template, is required for each work to be recognized. One template per word is adequate for many recognition purposes, for example, practiced speakers in a relatively quiet environment. Increased robustness of recognition accuracy may be achieved for novice speakers with highly variable voiceprints, or for recognition in an adverse noisy background, by providing several templates per word. It has been found experimentally that two templates per word suffice for all but the most critical applications.

Thus, FIG. 13 shows a word template comprised of a set of feature ensembles (X) which together characterize the word of FIG. 1. Each feature ensemble consists of 56 bits of data which represent the salient information derived from 2048 bits of ADC sampling data ($2 \times 128 \times 8$). This 56 bits is comprised of the mean value $\bar{X}$ (5 bits), the instantaneous mean value slope $\dot{\bar{X}}$ (3 bits) and the 16 deviation from mean values $\Delta X^0 - \Delta X^{15}$ (3 bits each). This data for each word template is ultimately stored in the external RAMs for the system.

To recognize a word, a digital voiceprint is created and is compared to each of the templates in the vocabulary storage memory. The best match, subject to an acceptance criterion, is selected as the recognized word. Recognition accuracy and robustness (i.e., maintaining accuracy under adverse conditions) is strongly dependent on the word matching process, which in turn depends critically on the acoustic features and the means of comparison.

Matching a voiceprint to a stored template is accomplished in our invention by a novel feature comparison combined with a dynamic programming optimization technique.

The incoming voiceprint is defined by a sequence of acoustic features, which are time-averaged spectral amplitudes and time-rates-of-change of spectral amplitudes. The templates are defined similarly. We shall consider first the comparison of a single feature of the incoming word comprising the spectral sequence ($\bar{x}^j$, $\dot{x}^j$), and a single feature of the template ($\bar{y}^j$, $\dot{y}^j$). The measure of the degree of similarity is given by a novel metric function which is a feature of our invention:

$$d = \sum_{j=0}^{15} \frac{(\bar{x}^j - \bar{y}^j)^2}{1 + a^2 (\bar{x}^j + \bar{y}^j)^2} \tag{19}$$

Here "a" is a scaling factor to account for normal rates of speech. In the preferred embodiment it is taken to be 6 msec/dB.

The metric d differs from prior art in the use of time-rates-of-change of spectral amplitudes. The effect of this usage is to provide a topological (i.e., continuous) metric that is insensitive to high rates of amplitude variation within a speech signal, and which provides an important element of noise immunity.

Prior art metrics for estimating the similarity of acoustic features depend upon the instantaneous value of the spectral amplitudes, and do not innclude time-rates-of-change. For example, the prior art Euclidean metric may be defined as:

$$d_E = \sum_{j=0}^{15} (\bar{x}^j - \bar{y}^j)^2 \tag{20}$$

In FIG. 14 is shown graphically the difference between metric concepts in the case of a rapidly changing speech signal with a slight time misregistration between the word and the template. The Euclidean distance $d_E$ between word and template in a region of high slope may be quite large due to even a small time misregistration. The topological metric d of this invention may be represented as the diameter of a ball between the two curves, not the vertical distance. Consequently, a small misregistration of timing leads to a correspondingly small distance. This topological metric using time-rates-of-change provides a consistently better measure of similarity between acoustic features than the Euclidean metric, which is sensitive to high rates of change.

A further advance of the topological metric over prior art is its contribution to noise immunity. To achieve a close measure of similarity, not only must the spectral amplitudes match, but also the time-rates-of-change of the spectral amplitudes. It is highly unlikely for noise signals to match both conditions at once.

Those skilled in the art will recognize that the means to achieve topological smoothness of the metric with regard to time registration in highly fluctuating speech may also be applied to other metrics, for example, the Chebyshev metric. Thus, we may have as an alternate to Equation (19):

$$d = \sum_{j=0}^{15} \frac{|\bar{x}^j - \bar{y}^j|}{\sqrt{1 + a^2 (\bar{x}^j + \bar{y}^j)^2}} \tag{21}$$

The essential feature of this invention is to provide a means for reducing apparent differences in spectral amplitude in regions of high rates of change by utilizing corrections based on time-rates-of-change.

The major advantages of the topological metric may be preserved and computation greatly reduced by storing template data in terms of average amplitude and spectral differences, and by using the average time-rate-of-change to provide the topological correction. The formula used in the preferred embodiment is:

$$d = \frac{\left[ b(\bar{x} - \bar{y})^2 + \sum_{j=0}^{15} (\Delta x^j - \Delta y^j)^2 \right]}{1 + a^2 (\bar{x} + \bar{y})^2} \tag{22}$$

Here b is a constant which may be 16 for closest equivalence to Equation (19), or may be varied as a further parameter in improving recognition performance. In the preferred embodiment b=8.

The topological metric of Equation (22) is computed in the preferred embodiment by means of a series of table look ups (in which a value X is replaced by its square $X^2$), additions, and a table look up to perform the slope correction.

Prior art dynamic programming optimization techniques, well known to those versed in the art, may be used to achieve optimum time registration between the voiceprint of the incoming word and the template under comparison.

The topological metric of this invention provides two improvements over prior art speech recognizers based on dynamic programming: (1) substantial reduction in calculational effort; and (2) improvement in noise immunity. Reduction in calculational effort is achieved from the fact that the topological metric is able to compare acoustic features representing longer periods of time, even in the presence of rapidly varying speech patterns. Dynamic programming calculations are reduced in inverse proportion to the square of the time period, for example, a doubling of the period reduces calculations by a factor of four. A further benefit is a reduction in template storage as the time period covered by the data increases. In the preferred embodiment the time period is 32 msec, representing information from two 16-msec frames of spectral data from the spectrum analyzer.

Noise immunity in the preferred embodiment is further improved by elimination of word boundary considerations. Prior art use of dynamic programming techniques for word recognition require identification of word start and word stop. Since words frequently start and stop on sibilants or other low-energy unvoiced segments of speech, noise is particularly troublesome for prior art word boundary algorithms. This invention eliminates word boundary considerations by assigning an arbitrary start (200 msec before first appearance of voiced speech) and an arbitrary stop (200 msec after last appearance of voiced speech) in the preferred embodiment. Accurate time registration is achieved by means of dynamic programming methods known to those versed in the art, combined with the highly effective topological metric. By these means accurate recognition is achieved even in the presence of noise levels which are comparable to the low-energy unvoiced components of speech; there is degradation of accuracy as noise level is increased, but there is no catastrophic cessation of recognition as occurs in prior art word recognizers relying on word boundary algorithms.

Voice Reproduction

Voice reproduction is a substantially simpler task than voice recognition, and is accomplished in this invention using only a portion of the digital processing capability.

A person trains the unit for voice reproduction by creating and storing digital voiceprints. Each stored voiceprint comprises a time sequence of spectral amplitudes, as shown in FIG. 8, which may be reduced in data content for compact storage in an external memory, i.e., RAM 40.

To reproduce speech, the spectral amplitudes are processed by the voice processor 38 previously described. It is a feature of this invention that the digital spectrum analysis method is reversible, and a frame of spectral amplitudes may be processed to yield a frame of reconstituted voice signals in the form of digital amplitudes.

The reconstituted voice signal amplitudes are passed through the digital-to-analog converter 26 and amplified to create an audible sound in a loudspeaker, telephone, or other audio apparatus.

Voiceprint Feature Extraction for Voice Reproduction

The voiceprint features most suitable for voice reproduction do not necessarily coincide with the voiceprint features most suitable for voice recognition. This results from the fact that people expect qualities in reproduced voice that have nothing to do with recognition; for example, whether the speaker is male or female, the emotional state of the speaker, and so forth. Absence of these qualities tends toward a machine-like or robotic quality which many people find objectionable. The additional features required for quality voice reproduction tend to increase the number of bits in the digitally stored voiceprint.

Another feature of this invention is the ability to create and store voiceprints for both recognition and reproduction purposes.

In the preferred embodiment of the invention the voice signal to be stored for later reproduction is spectrally analyzed on a frame-by-frame basis exactly as is done for recognition. However, the feature extraction process is different. In the preferred embodiment the spectral amplitudes below a threshold magnitude are discarded by providing suitable instructions within the macro-ROM of the voice processor 38. The remaining amplitudes above the desired level are represented by a limited number of bits. The voiceprint data thus consists of a bit-reduced sequence of spectral amplitudes.

Quality of the reproduced voice depends directly on the number of bits preserved in the voiceprint. For a typical word consisting of 40 frames of 16 milliseconds each, or a total of 640 milliseconds, the initial number of bits is 40,960 (40×128×8). Excellent quality of preserved when the voiceprint data is reduced to 8,000 bits; yet the word can be adequately recognized, but with a robotic quality, at 1,000 bits.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method for providing a spectral analysis of an analog signal waveform comprising the steps of:
dividing the total incoming analog signal into time frames of equal duration;
converting the analog signal to a sequence of discrete signal amplitudes at equally spaced time intervals in each frame;
transforming the sequence of discrete signal amplitudes to a sequence of complex spectral amplitudes, each such spectral amplitude representing the magnitude and phase of a function V(n,k) defined as:

$$V(n,k) = \exp\left[ j\pi \left( \sum_{r=0}^{p} \sum_{t=0}^{m} n_{p-r} k_{r-t} 2^{-t} + \phi \right) \right]$$

wherein
k = time sequence index
n = frequency sequence index
r,t = integer summation indexes
m = time function parameter defining the number of retained bits
$\phi$ = phase adjustment function
and the subscripts (p-r) and (r-t) for n and k refer to bit locations in their binary representation with bit locations ranging from o to the maximum value p, and subscript values outside this range representing vanishing values.

2. The method of claim 1 wherein the phase adjustment function $\phi$ is defined as:

$$\phi = 2^{-m} \sum_{r=0}^{p} n_{p-r} k_{r-m-1}.$$

3. The method of claim 1 wherein the phase adjustment function $\phi$ is zero.

4. The method of claim 1 wherein the transformation from a sequence of discrete signal amplitudes to a sequence of complex spectral amplitudes is accomplished by establishing a processing array; transferring the signal amplitude data to the array in accordance with the expression $$A^o(k_p, k_{p-1}, \ldots, k_o) = Z(k_p, k_{p-1}, \ldots, k_o)$$

wherein $A^o$ represents the starting values of the array and Z represents the signal data in the form of binary digits;
starting from the original sequence of signal data substituting one bit of the spectral sequence n for one bit of the time sequence k in accordance with the expression:

$$A^{r+1}(n_o, n_1, \ldots, n_r, k_{p-r-1}, \ldots, k_o) = \sum_{k_{p-r}=0}^{1} A^r(n_o, \ldots, n_{r-1}, \quad (6)$$

$$k_{p-r}, \ldots, k_o) \cdot \exp\left[ j\pi n_r \left( \sum_{t=0}^{m} k_{p-r-t} 2^{-t} + k_{p-r-m-1} 2^{-m} \right) \right]$$

wherein
$A^r$ = results of the $r^{th}$ step of processing, beginning at r=o and ending at r=p+1 determining the sequence of complex spectral amplitudes from the final step of the processing array in accordance with the formula:

$$S(n_p, n_{p-1}, \ldots, n_o) = A^{p+1}(n_o, n_1, \ldots, n_p)$$

wherein

S = the desired sequence of complex spectral amplitudes.

5. A method for producing an analog signal waveform comprising the steps of:

providing a predetermined series of digital signals representing a sequence of complex spectral amplitudes;

transforming the sequence of complex spectral amplitudes to a sequence of discrete time waveform amplitudes, each such spectral amplitude representing the magnitude and phase of a function V(n,k) defined as:

$$V(n, k) = \exp\left[j\pi \left(\sum_{r=0}^{p} \sum_{t=0}^{m} n_{p-r} k_{r-t} 2^{-t} + \phi\right)\right]$$

wherein k = time sequence index
n = frequency sequence index
r,t = integer summation indexes
m = time function parameter defining the number of retained bits
$\phi$ = phase adjustment function converting the transformed digital data into an analog output signal.

6. The method of claim 5 wherein the phase adjustment function $\phi$ is defined as $$\phi = 2^{-m} \sum_{r=0}^{p} n_{p-r} k_{r-m-1}.$$

7. The method of claim 5 wherein the phase adjustment function $\phi$ is zero.

8. The method of claim 5 wherein the transformation from a sequence of complex spectral amplitudes to a sequence of discrete time waveform amplitudes is accomplished by establishing a processing array; transferring the complex conjugate of the spectral amplitude data to the array in accordance with the expression $$A^o(n_p, n_{p-1}, \ldots n_o) = S^*(n_p, n_{p-1}, \ldots n_o)$$

wherein $A^o$ represents the starting values of the array and $S^*$ represents the complex conjugate of the spectral amplitude data in the form of binary digits;

starting from the original sequence of spectral amplitude data one bit of the time sequence k is substituted for one bit of the spectral sequence n in accordance with the formula:

$$A^{r+1}(k_o, k_1, \ldots k_r, n_{p-r-1}, \ldots n_o) = \sum_{k_{p-r}=0}^{1} A^r(k_o \ldots k_{r-1},$$

$$n_{p-r} \ldots n_o) \cdot \exp\left[j\pi k_r \left(\sum_{t=0}^{m} n_{p-r-t} 2^{-t} + n_{p-r-m-1} 2^{-m}\right)\right]$$

wherein $A^r$ = results of the $r^{th}$ step of processing, beginning at r = o and ending at r = p+1, determining the sequence of time waveform amplitudes from the final step of the processing array in accordance with the formula:

$$Z(k_p, k_{p-1}, \ldots k_o) = R_e A^{p+1}(k_o \ldots k_p)$$

wherein

Z = the desired sequence of time waveform amplitudes
$R_e A^{p+1}$ = the real part of complex values representing the final stage of processing.

9. A method for producing audio analog output comprising the steps of:

providing a predetermined series of encoded digital signals representing the analog output to be produced;

decoding the encoded signals to provide a sequence of complex spectral amplitudes;

transforming the sequence of complex spectral amplitudes to a sequence of discrete time waveform amplitudes, each such spectral amplitude representing the magnitude and phase of a function V(n,k) defined as:

$$V(n, k) = \exp\left[j\pi \left(\sum_{r=0}^{p} \sum_{t=0}^{m} n_{p-r} k_{r-t} 2^{-t} + \phi\right)\right]$$

wherein k = time sequence index
n = frequency sequence index
r,t = integer summation indexes
m = time function parameter defining the number of retained bits
$\phi$ = phase adjustment function;

converting the transformed digital data into an analog output signal.

10. The method of claim 9 wherein the encoded digital signals representing the analog output are provided from an external memory bank.

11. The method of claim 9 wherein the encoded digital signals representing the analog output are provided by performing a spectral analysis of an analog signal input to produce a digital voiceprint.

12. The method of claim 11 wherein the spectral analysis includes the steps of:

dividing the total signal into time frames of equal duration;

converting the analog signal to a sequence of discrete signal amplitudes at equally spaced time intervals in each frame;

transforming the discrete signal amplitudes of each frame to a preselected number of spectral amplitudes representing values of various frequency components of the said series of signal amplitudes;

reducing the number of spectral coefficients of each frame by comparing the magnitude of each coefficient to a predetermined threshold value, and eliminating coefficients which are below the threshold;

reducing the number of bits describing each remaining coefficient to a predetermined maximum.

13. A method for producing a voiceprint template for recognition of an analog waveform signal comprising the steps of:

dividing the total signal into time frames of equal duration;

converting the analog signal to a sequence of discrete signal amplitudes at equally spaced time intervals in each said frame;

transforming the discrete signal amplitudes of each frame to a preselected number of spectral amplitudes representing values of various frequency components of the said series of signal amplitudes;

compacting and converting the spectral amplitudes of each frame to a lesser number of channels, each channel being comprised of an energy summation of amplitudes within a designated frequency range expressed in logarithmic amplitudes, and allocated on the basis of predetermined acoustic significance;

deriving a mean amplitude value for all of said channels of each frame;

measuring a deviation from said mean value for each separate channel amplitude in each frame;

determining a feature ensemble for a plurality of successive frames of said total waveform signal; and storing a digital representation of said feature ensembles for said total waveform signal to form a digital coded template thereof.

14. The method of claim 13 wherein each said feature ensemble is comprised of a pair of adjacent successive frames of the total waveform signal.

15. The method of claim 14 wherein each said feature ensemble is comprised of the average mean amplitude value of each frame pair, the slope of the difference in mean values of the same channel in the adjacent pair of frames, and the average amplitude deviation from the mean values for each channel of each frame pair.

16. A word recognition method comprising the steps of:

providing a digital data template representing preselected acoustic features of a spoken word which include time-rates-of-change of spectral amplitudes;

receiving a spoken word to be compared and performing a spectral analysis thereof to determine data representing its acoustic features including time-rates-of-changes of spectral amplitudes;

comparing the template with the received spoken word spectral analysis data to determine a degree of similarity between features given by the metric function:

$$d = \frac{\left[ b(\bar{x} - \bar{y})^2 + \sum_{j=0}^{15} (\Delta x^j - \Delta y^j)^2 \right]}{1 + a^2 (\dot{\bar{x}} + \dot{\bar{y}})^2}$$

where:
d = degree of similarity
j = channel index
a = a scaling factor to account for normal rates of speech
b = a parameter for improving recognition performance
$\bar{x}$ = mean amplitude value of spoken word template
$\bar{y}$ = mean amplitude value of stored word template
$\dot{\bar{x}}$ = time-rate-of-change of spoken word template
$\dot{\bar{y}}$ = time-rate-of-change of stored word template
$\Delta x^j$ = deviation of channel amplitude from mean value in spoken word template
$\Delta y^j$ = deviation of channel amplitude from mean value in stored word template; and producing an output in response to a predetermined degree of similarity between said template and said spoken word data.

17. The method of claim 16 wherein said digital data template is retrieved from an external memory storage.

18. The method of claim 16 wherein said digital data template is established by providing an initial training word; performing a spectral analysis of said training word to produce said template; and temporarily storing said training word template before comparing it with the subsequently said received spoken word.

19. The method of claim 16 wherein the step of producing an output includes the sub step of providing stored digital data representing predetermined analog signals; and synthesizing said stored data to produce the analog signals.

20. A voice recognition system for producing a voiceprint template of an analog waveform signal comprising:

means for converting an incoming analog signal to a sequence of discrete digital signals;

voice processor means including a timing generator for producing repetitive series of timing cycles, counter means for dividing the total incoming signal into time frames of equal length, sequence control means connected to said timing generator including ROM means for providing operating instructions for the processor during said timing cycles, an arithmetic logic unit for performing a spectral analysis of the received digital signals in response to instructions from said ROM means, said ROM means including instructions for: transforming the discrete signal amplitudes to a preselected number of spectral amplitudes representing values of various frequency components of the said series of signal amplitudes, compacting and converting the spectral amplitudes of each frame to a lesser number of channels, each channel being comprised of a summation of amplitudes within a designated frequency range allocated on the basis of predetermined acoustic significance, deriving a mean amplitude value for all of said channels of each frame, measuring a deviation from said mean value for each separate channel amplitude in each frame, and determining a feature ensemble for each pair of successive frames of said total waveform signal; and external memory means for storing a digital representation of said feature ensembles for said total waveform signal comprising a digital coded template thereof.

21. A voice recognition system for producing a voiceprint template of an analog waveform signal comprising:

means for converting an incoming analog signal to a sequence of discrete digital signals;

voice processor means including a timing generator for producing repetitive series of timing cycles, counter means for dividing the total incoming analog signal into time frames of equal length, sequence control means connected to said timing generator including ROM means for providing operating instructions for the processor during said timing cycles, means including an arithmetic logic unit for performing a spectral analysis of the received analog signal in response to instructions from said ROM means, said ROM means including instructions for transforming the discrete signal amplitudes of each frame to a sequence of complex spectral amplitudes each representing the magnitude and phase of a function V (n, k) defined as:

$$V(n, k) = \exp\left[ j\pi \left( \sum_{r=0}^{p} \sum_{t=0}^{m} n_{p-r} k_{r-t} 2^{-t} + \phi \right) \right]$$

wherein:
k = time sequence index n = frequency sequence index
r,t = integer summation indexes
m = time function parameter defining the number of retained bits
$\phi$ = phase adjustment function said ROM means also including instructions for: compacting and converting the spectral amplitudes of each frame to a lesser number of channels, each channel being comprised of a summation of signal amplitudes within a designated frequency range allocated on the basis of predetermined acoustic significance; deriving a mean amplitude value for all of said channels of each frame; measuring a deviation from said mean value for each separate channel amplitude in each frame, and determining a feature ensemble for each pair of successive frames of said total waveform signal; and external memory means for storing a digital representation of said feature ensembles for said total waveform signal comprising a digital coded template thereof.

22. The voice recognition system as described in claim 20 wherein said ROM means includes means providing instructions for transforming a sequence of discrete signal amplitudes to a sequence of complex amplitudes by establishing a processing array and transforming signal amplitude data to the array in accordance with the expression:

$$A^0(k_p, k_{p-1}, \ldots, k_0) = Z(k_p, k_{p-1}, \ldots, k_0)$$

wherein $A^0$ represents the starting values of the array and Z represents the signal data in the form of binary digits;

said ROM means including further instructions for substituting one bit of the spectral sequence n for one bit of the time sequence k, starting from the original sequence of signal data, in accordance with the expression:

$$A^{r+1}(n_0, n_1, \ldots, n_r, k_{p-r-1}, \ldots, k_0) = \sum_{k_{p-r}=0}^{1} A^r(n_0 \ldots n_{r-1};$$

$$k_{p-r} \ldots k_0) \cdot \exp\left[j\pi n_r \left(\sum_{t=0}^{m} k_{p-r-t} 2^{-t} + k_{p-r-m-1} 2^{-m}\right)\right]$$

wherein:
$A^r$ = results of the $r^{th}$ step of processing, beginning at r=o and ending at r=p+1 said ROM means including further instructions for determining the sequence of complex spectral amplitudes from the processing array in accordance with the expression:

$$S(n_p, n_{p-1}, \ldots, n_0) = A^{p+1}(n_0, n_1, \ldots, n_p)$$

wherein:
S = the desired sequence of complex spectral amplitudes.

23. The voice recognition system as described in claim 22 wherein said voice processor includes means for comparing the voice template developed by spectral analysis of the analog signal with a second template stored in said external memory means.

24. The voice recognition system as described in claim 23 wherein said means for comparing includes ROM instruction means for determining a degree of similarity between features of the developed voice template and said second template in accordance with the function:

$$d = \frac{\left[b(\bar{x} - \bar{y})^2 + \sum_{j=0}^{15} (\Delta x^j - \Delta y^j)^2\right]}{1 + a^2(\bar{x} + \bar{y})^2}$$

25. The voice recognition system as described in claim 21 wherein said voice processor is in the form of an integrated circuit semiconductor device.

26. The voice recognition system as described in claim 21 wherein said voice processor is in the form of an integrated circuit semiconductor device that also includes said means for converting the incoming analog signal to digital signals.

27. A voice synthesis device comprising:
means providing a predetermined series of digital signals representing a sequence of preselected complex spectral amplitudes;
means for transforming said sequence of complex spectral amplitudes to a sequence of discrete time waveform amplitudes, each such spectral amplitude representing the magnitude and phase of a function V(n,k) defined as:

$$V(n, k) = \exp\left[j\pi \left(\sum_{r=0}^{p} \sum_{t=0}^{m} n_{p-r} k_{r-t} 2^{-t} + \phi\right)\right]$$

wherein:
k = time sequence index
n = frequency sequence index
r,t = integer summation indexes
m = time function parameter defining the number of retained bits
$\phi$ = phase adjustment function
and means for converting the transformed digital data into an analog output signal.

28. The voice synthesis device of claim 27 wherein said means for transforming includes:
means for establishing a processing array and thereafter transferring the complex conjugate of the spectral amplitude data to the array in accordance with the expression:

$$A^0(n_p, n_{p-1}, \ldots, n_0) = S^*(n_p, n_{p-1}, \ldots, n_0)$$

wherein $A^0$ represents the starting values of the array and S* represents the complex conjugate of the spectral amplitude data in the form of binary digits; and also including means for determining the sequence of time waveform amplitudes from the final processing array in accordance with the formula:

$$Z(k_p, k_{p-1}, \ldots, k_0) = Re\, A^{p+1}(k_0, \ldots, k_p)$$

wherein:
Z = the desired sequence of time waveform amplitudes
Re $A^{p+1}$ = the real part of complex values representing the final stage of processing,
means for substituting one bit of the time sequence k for one bit of the spectral sequence n, starting from the original sequence of spectral amplitudes data in accordance with the formula:

$$A^{r+1}(k_o, k_1, \ldots k_r, n_{p-r-1}, \ldots n_o) = \sum_{k_{p-r}=0}^{1} A^r(k_o, \ldots k_{r-1};$$

$$n_{p-r} \ldots n_o) \cdot \exp\left[j\pi k_r \left(\sum_{t=o}^{m} n_{p-r-t} 2^{-t} + n_{p-r-m-1} 2^{-m}\right)\right]$$

wherein:
$A^r$ = results of the $r^{th}$ step of processing, beginning at $r=o$ and ending at $r=p+1$.

* * * * *